(12) United States Patent
Kato

(10) Patent No.: US 7,920,803 B2
(45) Date of Patent: Apr. 5, 2011

(54) INFORMATION PROCESSING APPARATUS AND CONTROL METHOD THEREOF, COMPUTER PROGRAM AND IMAGE FORMING SYSTEM

(75) Inventor: Hisashi Kato, Yokohama (JP)

(73) Assignee: Canon Kabushiki Kaisha (JP)

( * ) Notice: Subject to any disclaimer, the term of this patent is extended or adjusted under 35 U.S.C. 154(b) by 529 days.

(21) Appl. No.: 12/026,058

(22) Filed: Feb. 5, 2008

(65) Prior Publication Data

US 2008/0187346 A1 Aug. 7, 2008

(30) Foreign Application Priority Data

Feb. 5, 2007 (JP) ................................. 2007-026069

(51) Int. Cl.
*G03G 15/00* (2006.01)
*G03G 15/22* (2006.01)
(52) U.S. Cl. ................................. 399/75; 399/13; 399/81
(58) Field of Classification Search .................. 399/9, 13, 399/16, 75, 81
See application file for complete search history.

(56) References Cited

U.S. PATENT DOCUMENTS

| | | | | | |
|---|---|---|---|---|---|
| 5,138,377 A | * | 8/1992 | Smith et al. | ...................... | 399/11 |
| 5,365,311 A | * | 11/1994 | Matsuoka | ........................ | 399/13 |
| 6,487,379 B2 | * | 11/2002 | Sato | ................................. | 399/16 |
| 6,608,974 B2 | * | 8/2003 | Kurita | .............................. | 399/13 |
| 6,963,698 B2 | * | 11/2005 | Kondo | ............................... | 399/8 |
| 2002/0025175 A1 | * | 2/2002 | Sato | ................................. | 399/16 |
| 2006/0204253 A1 | * | 9/2006 | Mae et al. | ........................ | 399/16 |
| 2006/0239708 A1 | * | 10/2006 | Kozuka et al. | .................. | 399/75 |
| 2007/0237529 A1 | * | 10/2007 | Katou | ............................... | 399/9 |

FOREIGN PATENT DOCUMENTS

| | | | | |
|---|---|---|---|---|
| JP | 05116833 A | * | 5/1993 | |
| JP | 06138740 A | * | 5/1994 | |
| JP | 7-6121 A | | 1/1995 | |
| JP | 2003076086 A | * | 3/2003 | |

* cited by examiner

*Primary Examiner* — David M Gray
*Assistant Examiner* — Fred Braun
(74) *Attorney, Agent, or Firm* — Rossi, Kimms & McDowell LLP

(57) ABSTRACT

Option unit configuration information indicating a mounting method of option units mounted to an image forming apparatus is acquired. An availability of use of an option unit mounted to the image forming apparatus is determined based on the mounting method of option units indicated by the acquired option unit configuration information and rules for setting the availability of use of an option unit mountable to the image forming apparatus which is stored in a storage medium. In this case, the rules are for setting, based on a mounting order of a plurality of option units mountable to the image forming apparatus, the availability of use of the option unit, and the option unit configuration information further includes information indicating a mounting order of a plurality of option units mounted to the image forming apparatus.

6 Claims, 19 Drawing Sheets

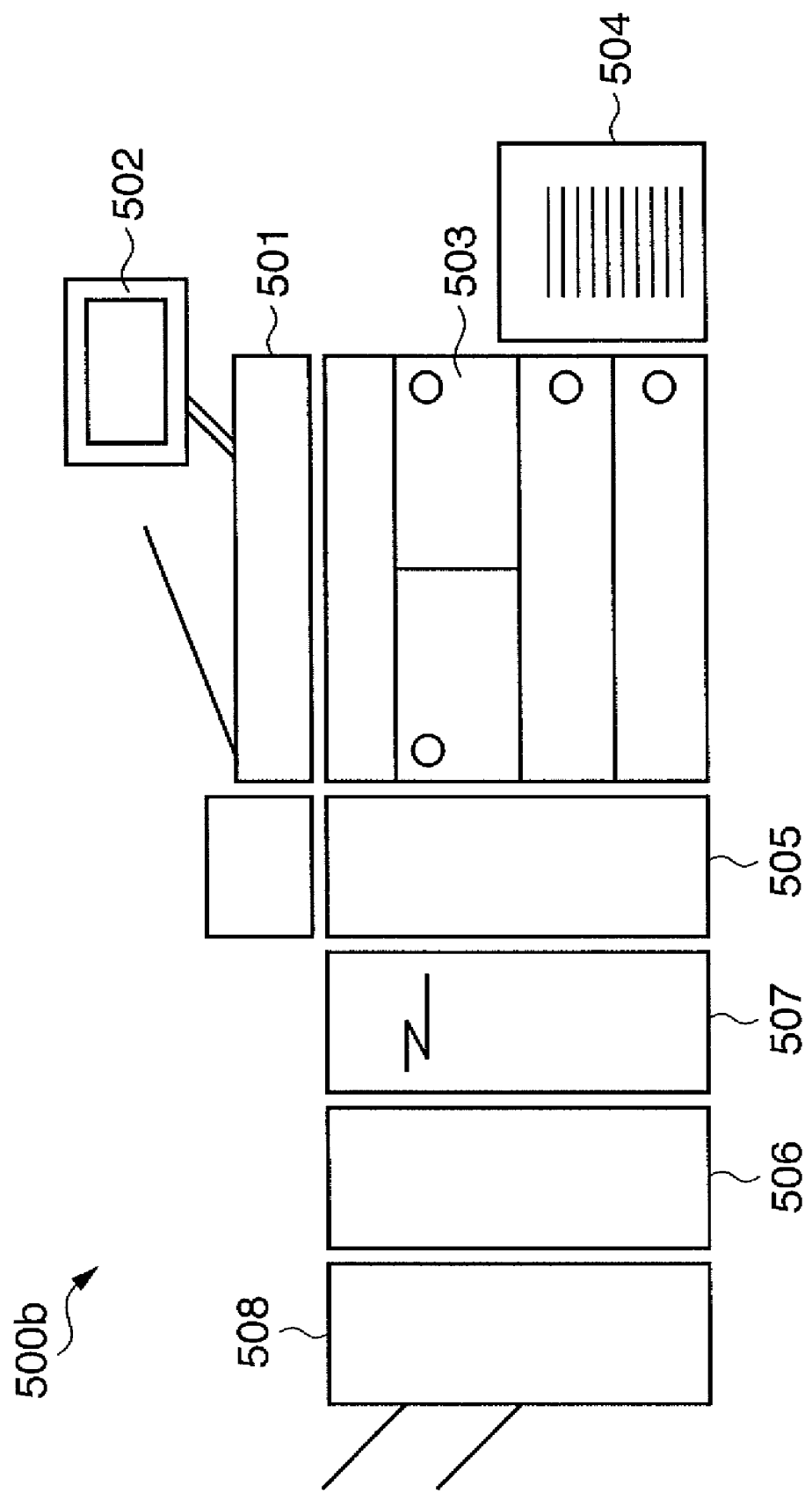

FIG. 6

OPTION UNIT CONFIGURATION INFORMATION 600

| MOUNTING DIRECTION | MOUNTING ORDER | OPTION NAME |
|---|---|---|
| HORIZONTAL 1 | 1 | STAPLE UNIT |
| HORIZONTAL 1 | 2 | PUNCHER UNIT |
| HORIZONTAL 1 | 3 | FOLDING UNIT |
| HORIZONTAL 1 | 4 | SADDLE TRAY |
| HORIZONTAL 2 | 1 | SIDE PAPER DECK |
| VERTICAL | 1 | ADF |

FIG. 15

OPTION UNIT CONFIGURATION INFORMATION 601

| MOUNTING DIRECTION | MOUNTING ORDER | OPTION NAME |
|---|---|---|
| HORIZONTAL 1 | 1 | STAPLE UNIT |
| HORIZONTAL1 | 2 | FOLDING UNIT |
| HORIZONTAL 1 | 3 | PUNCHER UNIT |
| HORIZONTAL 1 | 4 | SADDLE TRAY |
| HORIZONTAL 2 | 1 | SIDE PAPER DECK |
| VERTICAL | 1 | ADF |

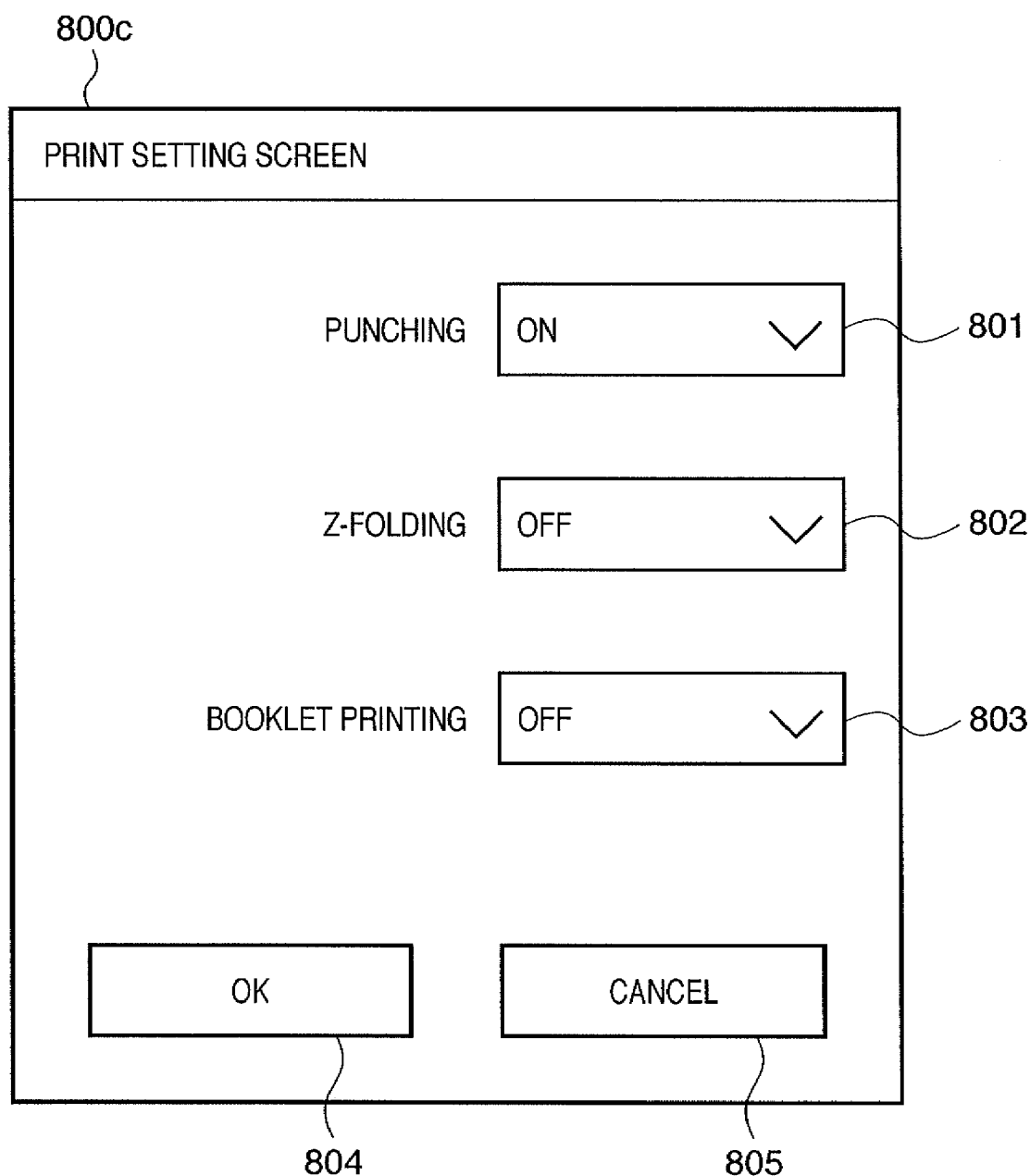

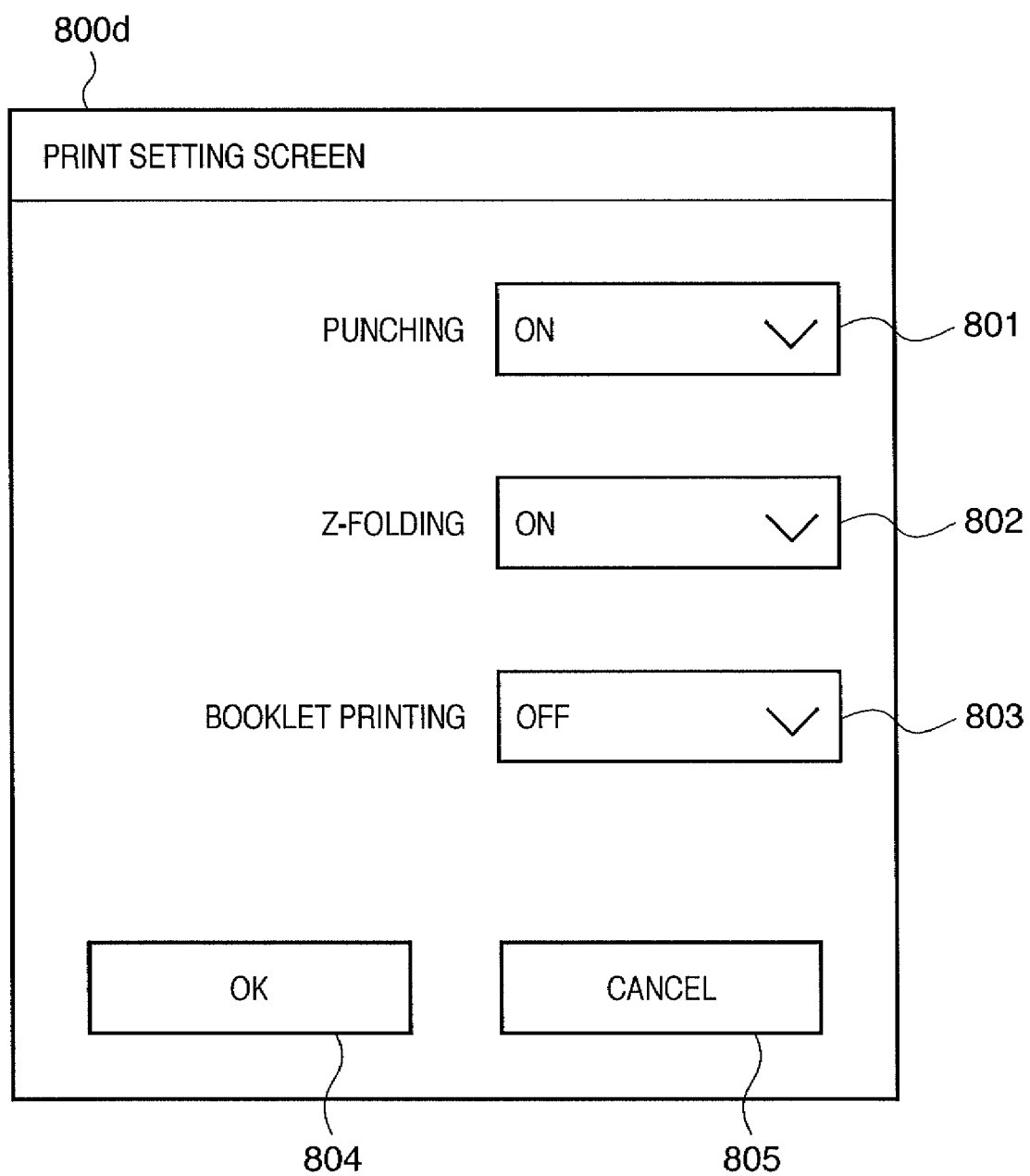

INFORMATION PROCESSING APPARATUS AND CONTROL METHOD THEREOF, COMPUTER PROGRAM AND IMAGE FORMING SYSTEM

BACKGROUND OF THE INVENTION

1. Field of the Invention

The present invention relates to an information processing apparatus that controls an image forming apparatus on which a plurality of option units is mountable and a control method thereof, a computer program and an image forming system.

2. Description of the Related Art

Recently, large-size digital multi-function peripherals are provided for high-end market for providing a print service called Print On Demand (POD) for the high-end market. With such large-size digital multi-function peripheral, various types of devices (option units) can be mounted to a main body unit in order to realize advanced finishing functions such as booklet printing, stapling, punching and the like. Option units required according to user needs can be selected to configure digital multi-function peripheral in various combinations of option units.

With such digital multi-function peripheral, processing for booklet printing and the like can be realized by changing settings on a panel user interface (hereinafter panel UI) provided on a main body. Alternatively, print settings can also be controlled using a print control program referred to as a printer driver on a host computer.

When executing printing from the print driver, settings are performed using a user interface of the printer driver (hereinafter driver UI). When performing setting with the driver UI, available functions will be unclear unless an option unit configuration of a digital multi-function peripheral to be printed is known in advance. Accordingly, there exists a printer driver equipped with a function for acquiring an option unit configuration of devices from a driver UI and displaying a preview screen of the option unit configuration.

In addition, digital multi-function peripheral in the high-end market include those which allow a mounting order of option units to be changed arbitrarily. With respect to digital multi-function peripherals provided with option units for which a mounting order thereof can be changed arbitrarily, a method for automatically recognizing a mounting order or the like has been proposed (Japanese Patent Laid-Open No. 7-6121).

Furthermore, with such digital multi-function peripherals that enable the mounting order of option units to be changed arbitrarily, there are cases where a functional restriction is applied depending on the mounting order of option units. For example, in the case where the orders of a puncher unit that realizes a function for opening punch holes and a folding unit that realizes a function for scoring paper are interchanged, punching processing can be performed after performing folding processing. Conversely, a restriction is conceivable such as the folding processing cannot be performed after performing the punching processing.

However, with respect to a restriction dependent on a mounting order as described above, the following problem exists when performing print setting on the printer driver side. That is, there is a problem in that a contradictory setting will be transmitted to the digital multi-function peripheral unless accurate order information of an option unit configuration is sent to the printer driver and, further, the contradiction in the setting dependent on the mounting order is resolved.

SUMMARY OF THE INVENTION

The present invention was made in order to solve the above problem, and an object thereof is to provide an information processing apparatus capable of performing settings related to option units of an image forming apparatus without contradiction and a control method thereof, a computer program and an image forming system.

According to one aspect of the present invention, an information processing apparatus that controls an image forming apparatus to which a plurality of option units is mountable, the information processing apparatus comprises:

storage means that stores rules for setting an availability of use of an option unit mountable to the image forming apparatus;

acquisition means that acquires option unit configuration information indicating a mounting method of an option unit mounted to the image forming apparatus; and determination means that determines, based on a mounting method of option units indicated by the option unit configuration information acquired by the acquisition means and a rule stored in the storage means, the availability of use of an option unit mounted to the image forming apparatus, wherein the rules are for setting, based on a mounting order of a plurality of option units mountable to the image forming apparatus, the availability of use of the option unit, and the option unit configuration information further includes information indicating a mounting order of a plurality of option units mounted to the image forming apparatus.

According to another aspect of the present invention, an image forming system including an image forming apparatus to which a plurality of option units is mountable and an information processing apparatus that controls the image forming apparatus, the image forming apparatus comprises:

first storage means that stores option unit configuration information indicating a mounting method of an option unit mounted to the image forming apparatus; and transmission means that transmits the option unit configuration information to the information processing apparatus based on a request from the information processing apparatus, the information processing apparatus comprises:

second storage means that stores rules for setting an availability of use of an option unit mountable to the image forming apparatus; and reception means that receives the option unit configuration information from the image forming apparatus, determination means that determines, based on a mounting method of option units indicated by the option unit configuration information received by the reception means and a rule stored in the storage means, the availability of use of an option unit mounted to the image forming apparatus, wherein the rules are for setting, based on a mounting order of a plurality of option units mountable to the image forming apparatus, the availability of use of the option unit, and the option unit configuration information further includes information indicating a mounting order of a plurality of option units mounted to the image forming apparatus.

According to still another aspect of the present invention, a control method of an information processing apparatus that controls an image forming apparatus to which a plurality of option units is mountable, the control method comprises:

an acquisition step for acquiring option unit configuration information that indicates a mounting method of an option unit mounted to the image forming apparatus; and a determination step for determining, based on a mounting method of option units indicated by the option unit configuration information acquired in the acquisition step and a rule for setting an availability of use of an option unit mountable to the image forming apparatus which is stored in a storage medium, the availability of use of an option unit mounted to the image forming apparatus, wherein the rules are for setting, based on a mounting order of a plurality of option units mountable to the image forming apparatus, the availability of use of the option unit, and the option unit configuration information further includes information indicating a mounting order of a plurality of option units mounted to the image forming apparatus.

According to yet another aspect of the present invention, a computer program, which is stored in a computer readable medium, that causes a computer to execute control of an information processing apparatus that controls an image forming apparatus to which a plurality of option units is mountable, the computer program causing the computer to execute;

an acquisition step for acquiring option unit configuration information that indicates a mounting method of an option unit mounted to the image forming apparatus; and a determination step for determining, based on a mounting method of option units indicated by the option unit configuration information acquired in the acquisition step and a rule for setting an availability of use of an option unit mountable to the image forming apparatus which is stored in a storage medium, the availability of use of an option unit mounted to the image forming apparatus, wherein the rules are for setting, based on a mounting order of a plurality of option units mountable to the image forming apparatus, the availability of use of the option unit, and the option unit configuration information further includes information indicating a mounting order of a plurality of option units mounted to the image forming apparatus.

Further features of the present invention will be apparent from the following description of exemplary embodiments with reference to the attached drawings.

BRIEF DESCRIPTION OF THE DRAWING

FIG. 2B is a diagram showing an example of a unit configuration of a printer according to an embodiment of the present invention;

FIG. 6 is a diagram showing an example of option unit configuration information according to an embodiment of the present invention;

FIG. 15 is a diagram showing an example of option unit configuration information according to an embodiment of the present invention;

FIG. 17 is a diagram showing an example of a UI screen according to an embodiment of the present invention; and FIG. 18 is a diagram showing an example of a UI screen according to an embodiment of the present invention.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
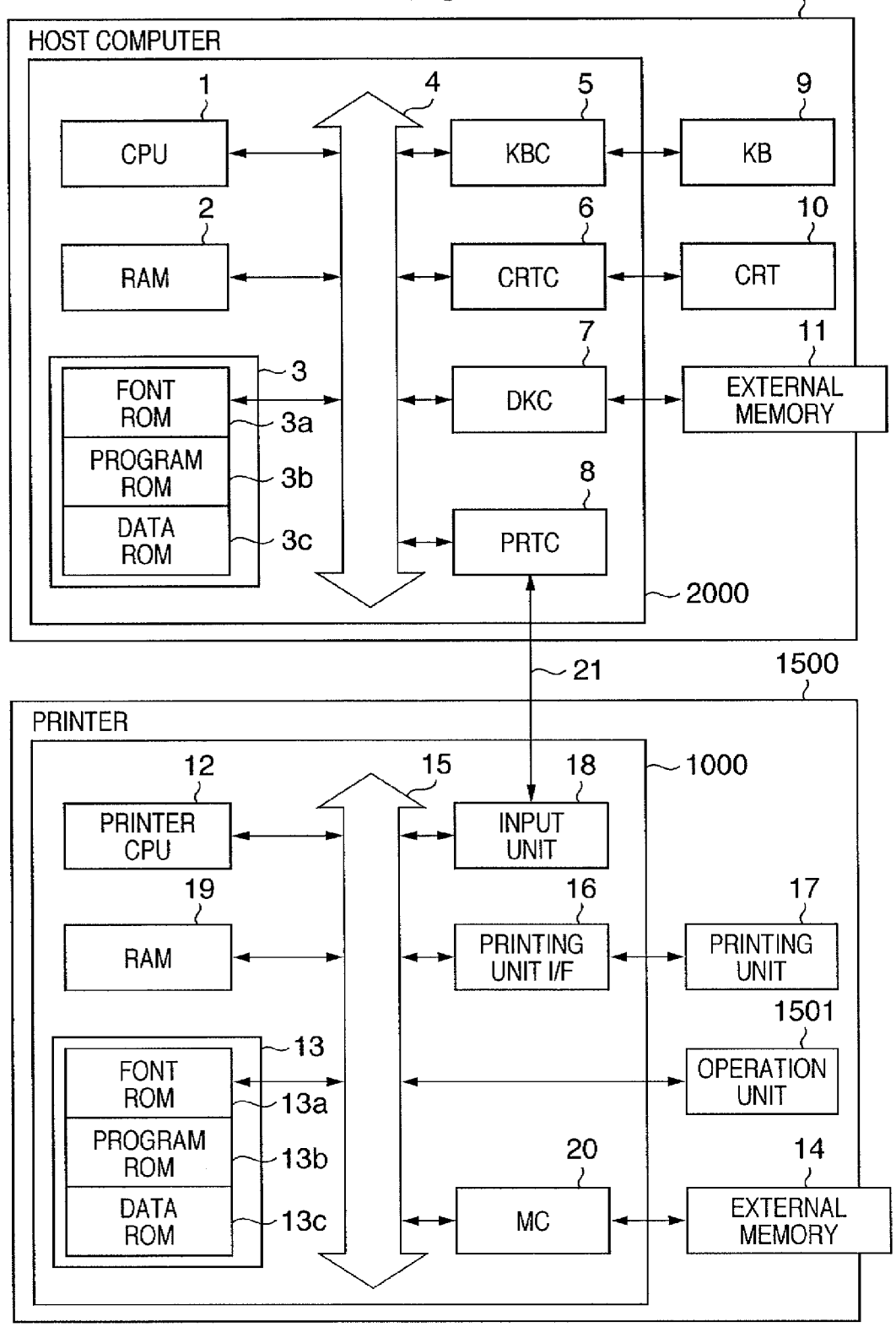
FIG. 1 is a block diagram showing a configuration of an image forming system according to an embodiment of the present invention.

FIG. 1 is a block diagram showing a configuration of an image forming system according to an embodiment of the present invention.

It is needless to say that the present invention is applicable to any system, be it a single unit, a system constituted by a plurality of units, or a system connected via a network such as a LAN or a WAN, as long as functions of the present invention can be executed by the system.

In FIG. 1, reference numeral 3000 denotes a host computer (information processing apparatus) that includes a CPU 1. The CPU 1 executes processing of documents in which components such as graphics, images, text, tables (including spreadsheets and the like) coexist based on a program such as a document processing program (application program) stored in a program ROM 3b of a ROM 3 or in an external memory 11. In addition, the CPU 1 performs overall control of each device connected to a system bus 4 in a host computer main body 2000.

The program ROM 3b of the ROM 3 or the external memory 11 also stores programs such as an operating system (hereinafter referred to as an OS) program that is a control program of the CPU 1. Data such as font data and the like to be used during the aforementioned document processing is also stored in the program ROM 3a of the ROM 3 or the external memory 11. The program ROM 3c of the ROM 3 or the external memory 11 additionally stores various data to be used when performing various processing including the aforementioned document processing.

Reference numeral 2 denotes a RAM that functions as a main memory, a work area and the like of the CPU 1. Reference numeral 5 denotes a keyboard controller (KBC) that controls key input from a keyboard (KB) 9 or a pointing device (not shown). Reference numeral 6 denotes a CRT controller (CRTC) that controls display on a CRT display (CRT) 10. An LCD controller and an LCD may be used in place of the CRT controller 6 and the CRT display 10.

Reference numeral 7 denotes a disk controller (DKC) that controls access to the external memory 11 that includes boot programs, various applications, font data, user files, edit files and the like. The DKC 7 also controls access to an external memory 11 that is a hard disk (HD), a floppy (registered trademark) disk (FD) or the like which stores various data such as a printer control command generation program (hereinafter referred to as a printer driver).

Reference numeral 8 denotes a printer controller (PRTC) that is connected to a printer (image forming apparatus) 1500 via a predetermined bidirectional interface 21 to execute control processing of communication with the printer 1500. Examples of bidirectional interfaces include a USB interface, an IEEE1394 interface, and a wireless LAN interface.

The CPU 1 realizes WYSIWYG on the CRT 10 by, for example, executing expansion (rasterization) processing of outline fonts on a display information RAM configured on the RAM 2. The CPU 1 also opens various registered windows based on commands instructed via a mouse cursor (not shown) or the like on the CRT 10, and executes various data processing. When executing printing, a user is able to open a window related to print settings to set printer settings or to set a printing method with respect to the printer driver including print mode selection.

In the printer 1500, reference numeral 12 denotes a printer CPU that performs overall control of each device connected to a system bus 15 in a printer control unit 1000. The printer CPU 12 also outputs an image signal as output information to a printing unit (printer engine) 17 to be connected to the system bus 15 based on a program such as a control program stored in a program ROM 13*b* of a ROM 13 or in an external memory 14.

The program ROM 13*b* of the ROM 13 also stores programs such as a control program of the printer CPU 12. Data such as font data and the like to be used when generating the aforementioned output information is stored in a font ROM 13*a* of the ROM 13. In the case of a printer that is not provided with the external memory 14 that is a hard disk (HD), an IC card, or the like, information or the like to be used on the host computer 3000 is stored on a data ROM 13*c* of the ROM 13.

The printer CPU 12 is arranged so as to be capable of processing communication with the host computer 3000 via an input unit 18, and is configured so that various information such as internal status information of the printer 1500 can be notified to the host computer 3000. Reference numeral 19 denotes a RAM that functions as a main memory, a work area and the like of the printer CPU 12. The RAM 19 is configured so that a memory capacity thereof can be expanded by means of an optional RAM to be connected to an expansion port (not shown).

The RAM 19 is used as an output information expansion region, an environmental data storage region, an NVRAM, or the like. Accessing the external memory 14 is controlled by a memory controller (MC) 20. The external memory 14 is connected as an optional unit and stored data such as font data, an emulation program, and form data. Reference numeral 1501 denotes an operating unit that is constituted by an operation panel for realizing various operations with respect to the printer 1500, a switch, an LED indicator, and the like.

The external memory 14 is not limited to a single unit. An alternative configuration is possible which is provided with at least one or more external memories 14, wherein a plurality of external memories storing, in addition to internal fonts, option font cards and programs that interpret printer control languages of different language systems can be connected. In addition, an NVRAM (not shown) may be provided and arranged so as to store printer mode setting information from the operation unit 1501.

Next, an example of a unit configuration of the printer 1500 will be described with reference to FIGS. 2A and 2B.

Figure 2A:
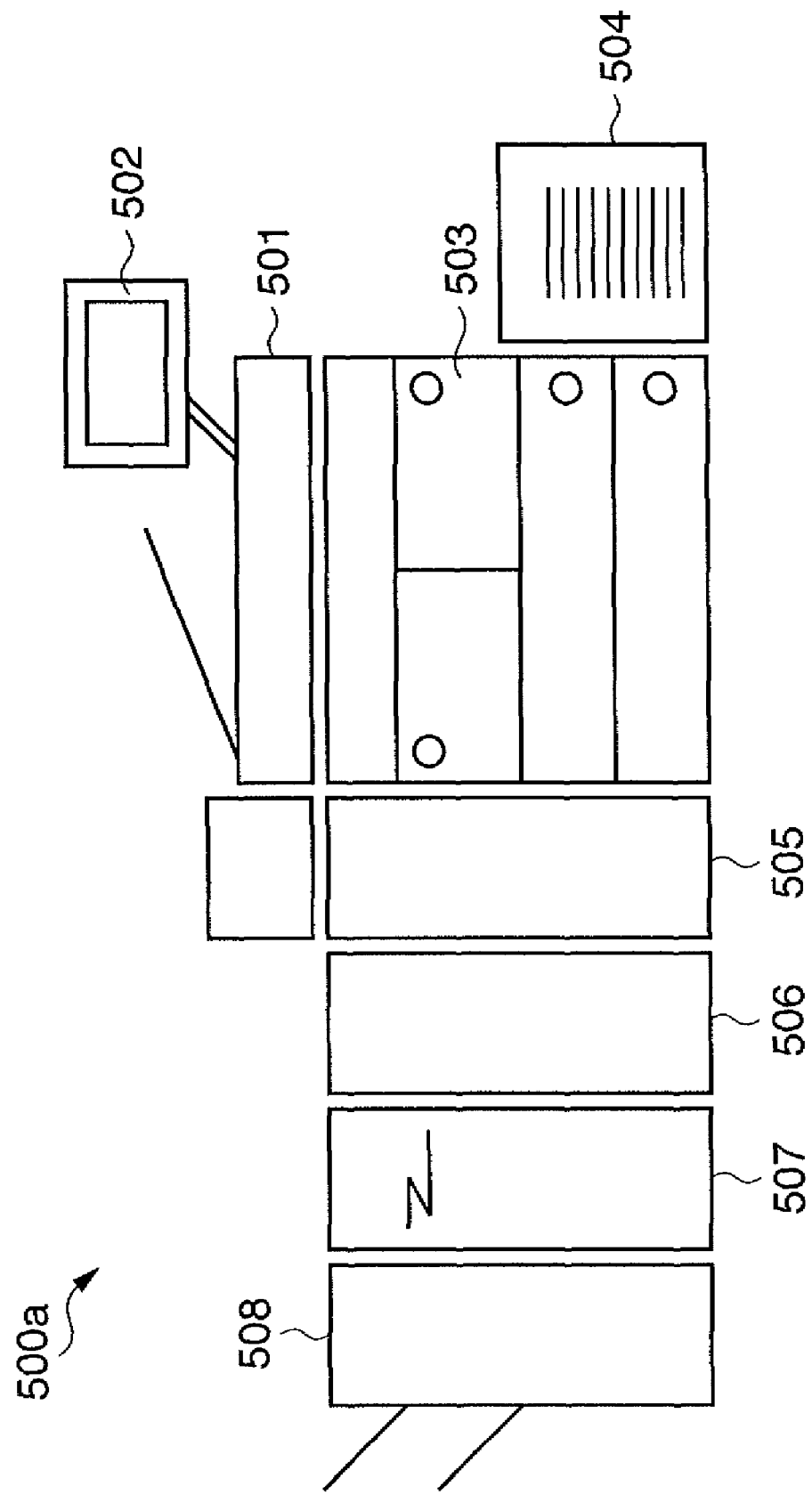
FIG. 2A is a diagram showing an example of a unit configuration a printer according to an embodiment of the present invention.

FIGS. 2A and 2B are diagrams showing an example of a unit configuration of a printer according to an embodiment of the present invention.

Reference numerals 500*a* shown in FIG. 2A and 500*b* shown in FIG. 2B respectively show an overall configuration of a multi-function peripheral (image forming apparatus) that is an example of the printer 1500.

Reference numeral 501 denotes an ADF (automatic document feeder) which is an apparatus that automatically sequentially scans a stack of original documents. Reference numeral 502 denotes an operation panel which, in order to display an operation window for performing various settings and adjustment, confirming unit status or the like, accepts various inputs performed via the operation window. Reference numeral 503 denotes a main body unit that is equipped with an image forming function for forming (printing) images on paper and which is capable of retaining paper of various sizes to be used for printing in separate paper feed units. The main body unit 503 functions as an image forming apparatus, and, for example, as for methods of performing image forming, is capable of utilizing various printing methods such as a laser beam method, an inkjet method, or the like.

While it is assumed that the ADF 501, the operation panel 502 and the main body unit 503 represent a minimum configuration of the printer 1500, a configuration to which an option unit group is mounted is also assumed to represent the printer 1500.

Reference numeral 504 denotes a side paper deck that is a unit for retaining a large amount of paper for printing. Reference numeral 505 denotes a staple unit which is a unit that realizes staple processing on paper. Reference numeral 506 denotes a puncher unit which is a unit that realizes punching processing on paper. Reference numeral 507 denotes a folding unit that includes a function for scoring paper and which is a unit that realizes folding processing such as half fold or z-fold when booklet printing is set. Reference numeral 508 denotes a saddle tray which is a unit that realizes saddle stitching during booklet printing.

FIGS. 2A and 2B show states wherein the positional relationship between the puncher unit 506 and the folding unit 507 is reversed.

As shown, the side paper deck 504, the staple unit 505, the puncher unit 506, the folding unit 507 and the like can be connected as option units (devices) to the multi-function peripheral 500*a* or 500*b*.

Next, a configuration of a printer driver and a printer upon option unit configuration information acquisition according to the present embodiment will be described with reference to FIG. 3.

Figure 3:
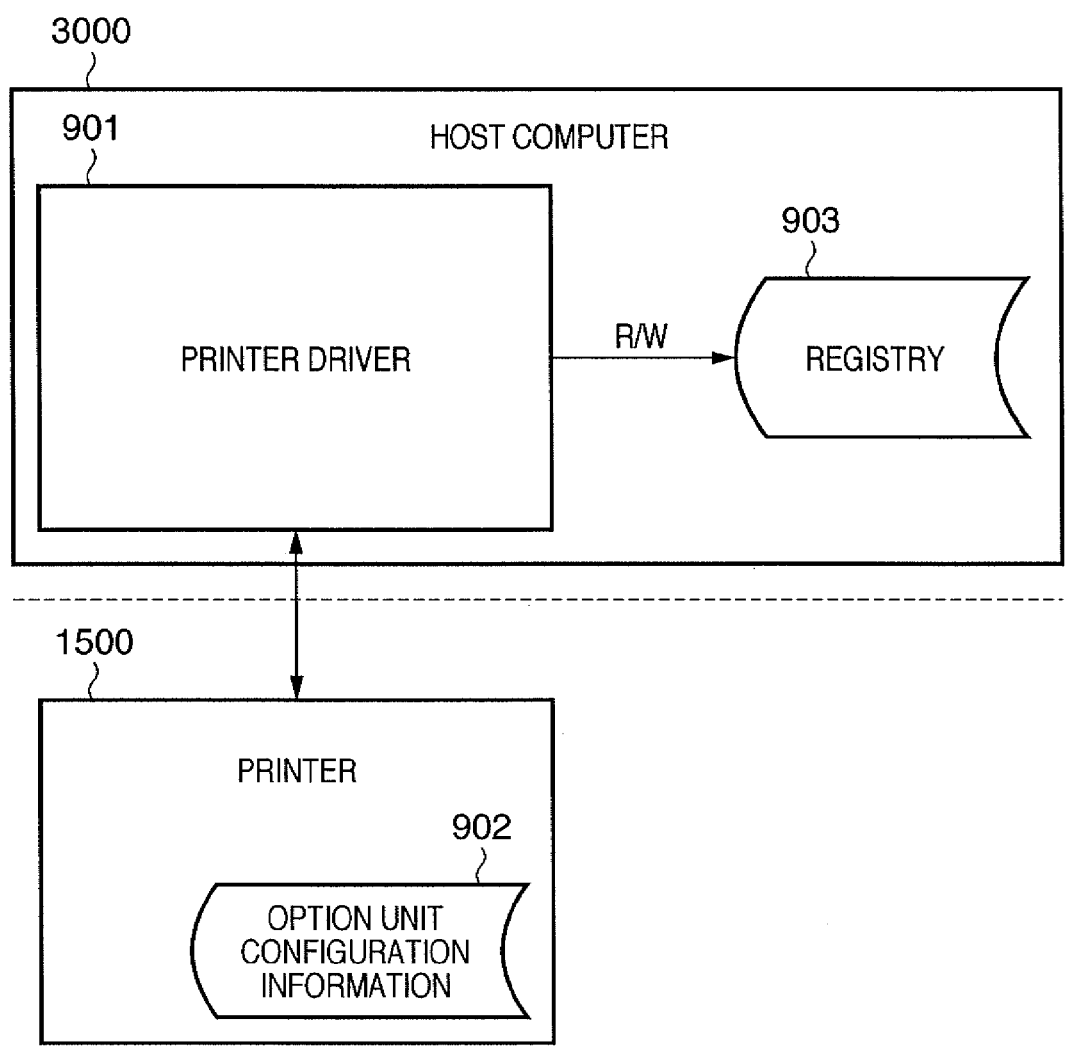
FIG. 3 is a diagram showing a functional relationship between a host computer and a printer according to an embodiment of the present invention.

FIG. 3 is a diagram showing a functional relationship between a host computer and a printer according to an embodiment of the present invention.

In FIG. 3, a printer driver 901 on the host computer 3000 acquires option unit configuration information 902 from the printer 1500. The printer driver 901 can manage the acquired option unit configuration information 902 by registering it to a registry 903 reserved on, for example, the RAM 2.

Next, a device setting screen for acquiring option unit configuration information will be described with reference to FIG. 4.

Figure 4:
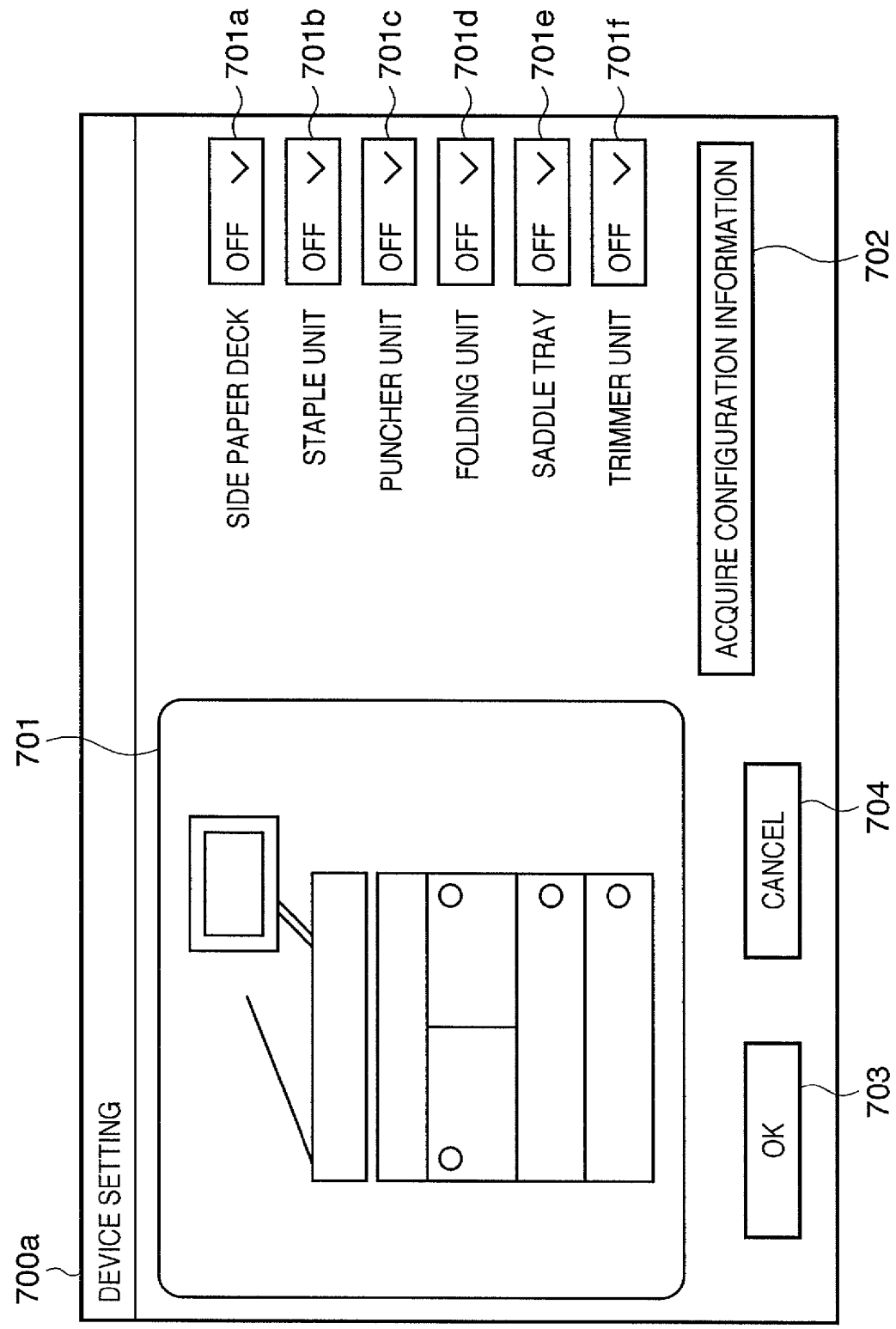
FIG. 4 is a diagram showing an example of a device setting screen according to an embodiment of the present invention.

FIG. 4 is a diagram showing an example of a device setting screen according to an embodiment of the present invention.

A device setting screen 700a is one of the driver UIs (user interfaces) provided by the printer driver 901 and is displayed on the CRT 10 of the host computer 3000. The user can execute operations on the device setting screen 700a using the keyboard 9 or a pointing device.

In particular, the device setting screen 700a represents a device setting screen in an initial state prior to the acquisition of option unit configuration information. A device preview region 701 schematically displays an option unit configuration of the printer 1500. In this case, a state is shown wherein the ADF 501, the operation panel 502 and the main body unit 503 are only displayed and no option units are mounted to the main body unit 503.

Various setting combo boxes 701a to 701f are UI controls for displaying mounting states of an option unit (device) group connectable (mountable) to the main body unit 503 (printer 1500) and for changing the mounting states. When an option unit is already mounted, "ON" is set to the combo box corresponding to the relevant option unit. When the option unit is not mounted, "OFF" is set to the combo box corresponding to the relevant option unit.

When newly mounting an option unit, a setting for mounting the option unit to the printer 1500 is realized by selecting the combo box corresponding to the relevant option unit and changing "OFF" to "ON".

In this case, a side paper deck, a staple unit, a puncher unit, a folding unit, a saddle tray and a trimmer unit are shown as examples of option units mountable to the printer 1500. However, it is needless to say that option units are not limited to these examples, and setting combo boxes corresponding to option units mountable to the printer 1500 can be configured as required.

A configuration information acquisition button 702 is a button for instructing the printer driver 901 to perform option unit configuration information acquisition processing. An OK button 703 is a button for saving setting contents with respect to the various setting combo boxes 701a to 701f as option unit setting information in the RAM 2 and closing the device setting screen 700a. A cancel button 704 is a button for discarding setting contents with respect to the various setting combo boxes 701a to 701f and closing the device setting screen 700a.

Next, option unit configuration information acquisition processing performed by the printer driver 901 for acquiring option unit configuration information of the printer 1500 will be described with reference to FIG. 5.

Figure 5:
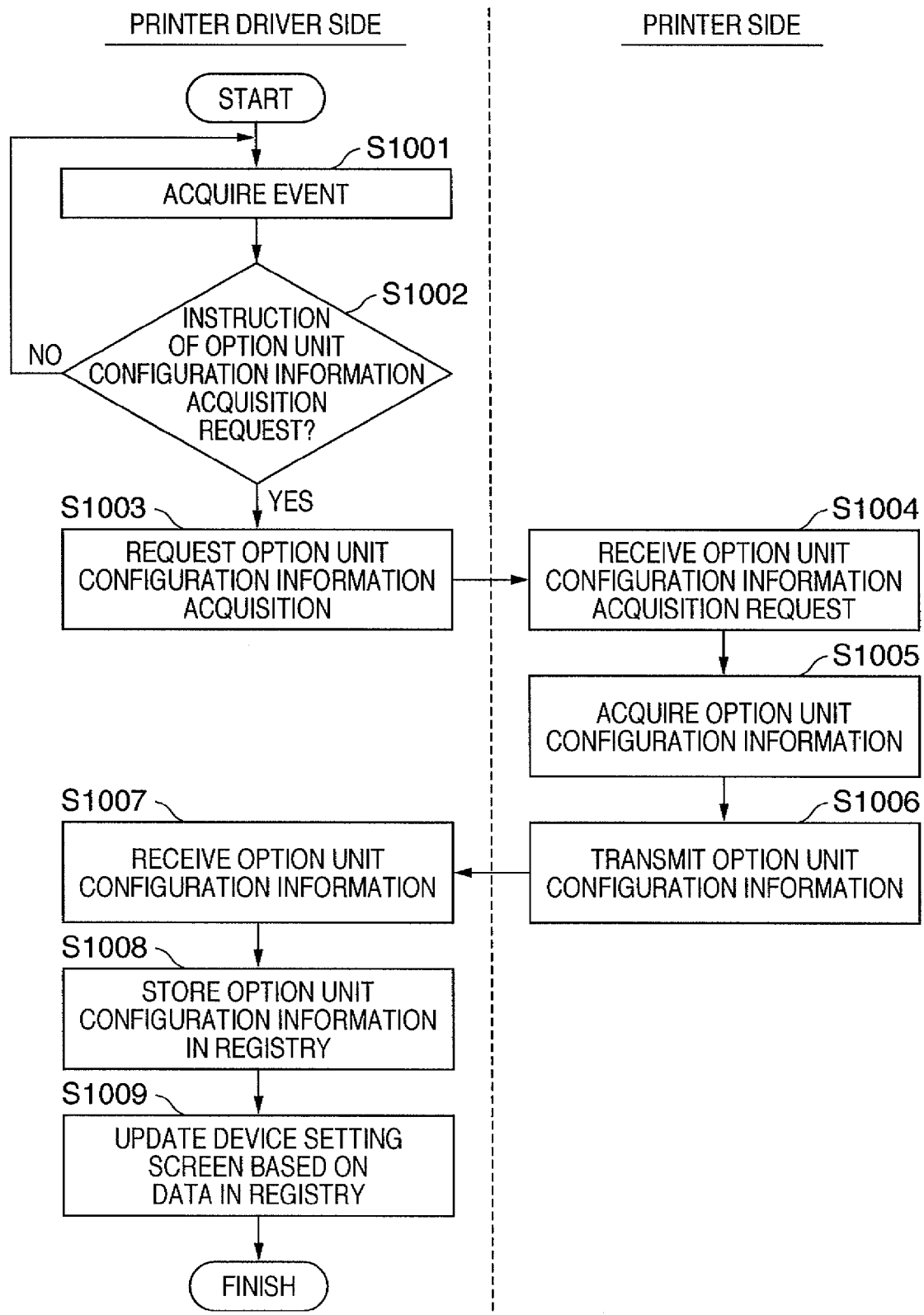
FIG. 5 is a flowchart showing option unit configuration information acquisition processing performed by a printer driver according to an embodiment of the present invention.

FIG. 5 is a flowchart showing option unit configuration information acquisition processing performed by a printer driver according to an embodiment of the present invention.

First, the printer driver 901 of the host computer 3000 acquires an event (step S1001). Next, the printer driver 901 judges whether the acquired event is an instruction for option unit configuration information acquisition (step S1002). If the acquired event is not an instruction for option unit configuration information acquisition (NO in step S1002), the processing flow returns to step S1001.

On the other hand, if the acquired event is an instruction for option unit configuration information acquisition (YES in step S1002), the printer driver 901 transmits an option unit configuration information acquisition request to the printer 1500 via the bidirectional interface 21 (step S1003).

In this case, it is assumed that an event of instructing option unit configuration information acquisition occurs at either a timing where the configuration information acquisition button 702 on the device setting screen 700a is pressed down or a timing where the printer driver 901 is installed. However, the event may also occur at other timings.

The printer 1500 receives the option unit configuration information acquisition request from the printer driver 901 via the bidirectional interface 21 (step S1004). The printer 1500 acquires option unit configuration information 902 stored in the external memory 14 (step S1005). The option unit configuration information 902 may be inputted explicitly by the user via the operation panel 502 of the printer 1500. Alternatively, the option unit configuration information 902 may be created as appropriate by means of a control program stored in the program ROM of the ROM 13 or a control program stored in the external memory 14 which causes the printer 1500 to automatically detect an option unit.

An example of option unit configuration information will now be described with reference to FIG. 6.

FIG. 6 is a diagram showing an example of option unit configuration information according to an embodiment of the present invention.

Option unit configuration information 600 represents information indicating a configuration of option units (devices) mounted to the multi-function peripheral 500a shown in FIG. 2A. Information on "mounting direction", "mounting order" and "option name" is stored in the option unit configuration information 600. The option unit configuration information 600 is presented here as an example of information indicating a mounting method of option units. Information indicating a mounting method refers to information that indicates in what state option units are mounted including, for example, a mounting direction, a mounting order, or the like.

As for mounting directions, as seen from the main body unit 503, the direction in which the puncher unit 506 is mounted has been defined as "horizontal 1", the direction of the side paper deck 504 as "horizontal 2", and the direction of the operation panel 502 as "vertical".

In other words, using the main body unit 503 as a reference, one horizontal direction (first direction) on the same straight line is defined as "horizontal 1" and the other (reverse) horizontal direction (second direction) thereon as "horizontal 2". In addition, using the main body unit 503 as a reference, a vertical direction in which the operation panel exists is defined as "vertical".

The "staple unit", the "puncher unit", the "folding unit" and the "saddle tray" are managed in this order that is a mounting order originating at the main body unit 503 shown in FIG. 2A in the mounting direction "horizontal 1" of the option unit configuration information 600. In addition, the "side paper deck" is managed in the mounting direction "horizontal 2" with the main body unit 503 shown in FIG. 2A as an origin thereof. Furthermore, the "ADF" is managed in the "vertical" mounting direction with the main body unit 503 shown in FIG. 2A as an origin thereof.

The present description will now return to FIG. 5.

The printer 1500 transmits the acquired option unit configuration information 902 to the printer driver 901 via the bidirectional interface 21 (step S1006).

The printer driver 901 receives the option unit configuration information 902 from the printer 1500 via the bidirectional interface 21 (step S1007).

Next, the printer driver 901 stores the received option unit configuration information 902 into the registry 903 (step S1008). Option unit setting information is stored in the registry 903 as information equivalent to the option unit configuration information 600 shown in FIG. 6. The printer driver 901 updates option unit setting information based on the option unit configuration information stored in the registry 903. The display contents of the device setting screen is updated based on the updated option unit setting information (step S1009).

An example of the updated device setting screen will now be described with reference to FIG. 7.

Figure 7:
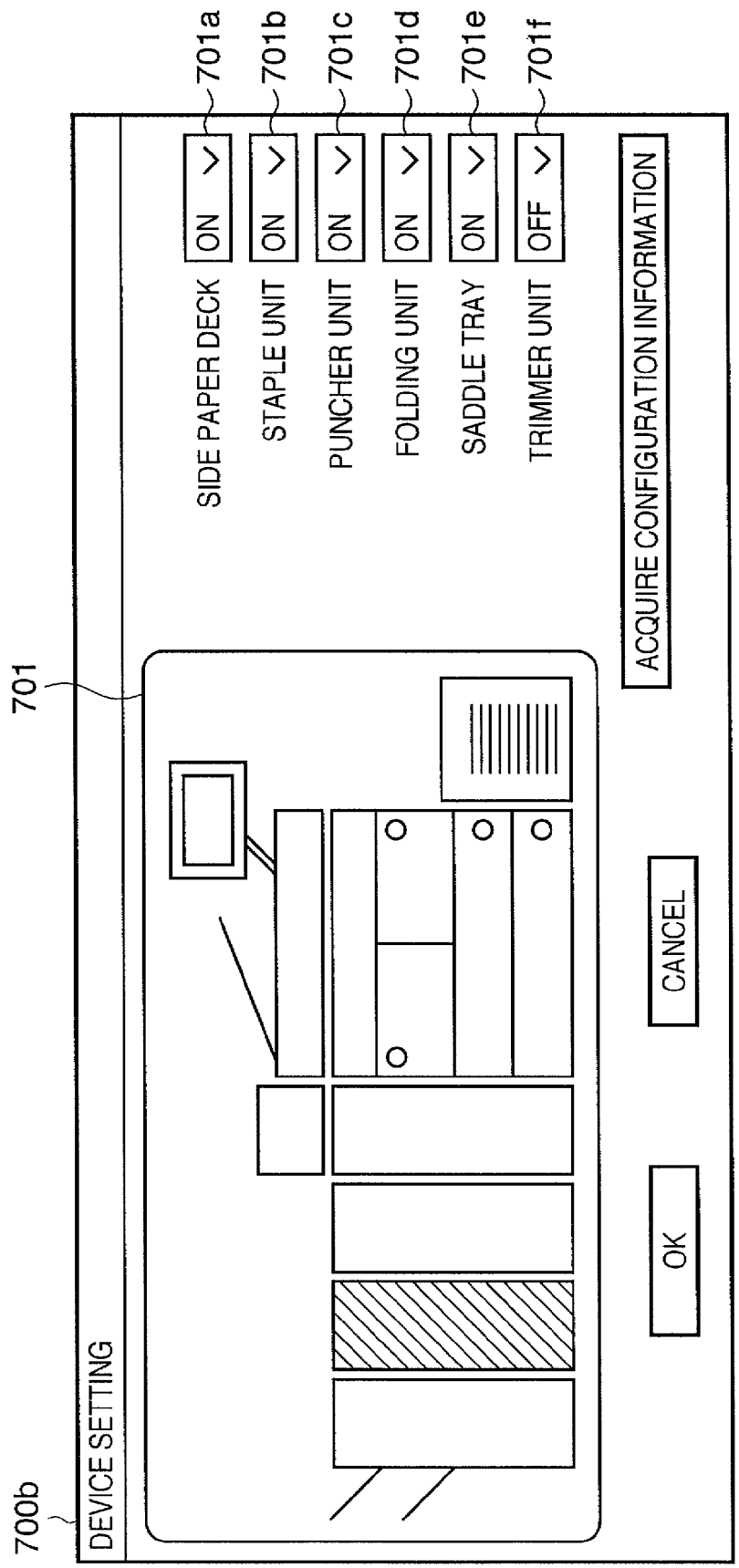
FIG. 7 is a diagram showing an example of a device setting screen after update according to an embodiment of the present invention.

FIG. 7 is a diagram showing an example of an updated device setting screen according to an embodiment of the present invention.

A device setting screen 700b shown in FIG. 7 is a screen created by option unit setting information in the registry 903 after the option unit configuration information 902 received from the printer 1500 is reflected onto the option unit setting information. The device setting screen 700b represents an update of the display contents of the device setting screen 700a shown in FIG. 4.

In this example, the option unit setting information is an update of the contents of the option unit configuration information 600 shown in FIG. 6. Therefore, option units mounted to the printer 1500 are the "staple unit", the "puncher unit", the "folding unit", the "saddle tray", the "side paper deck" and the "ADF".

In the device preview region 701, contents of the option unit configuration information 600 or, in other words, the option unit configuration of the multi-function peripheral 500a shown in FIG. 2A is displayed as a schematic image. In addition, in accordance with the mounted option units, display contents of combo boxes respectively corresponding thereto are changed from "OFF" to "ON".

Next, UI control processing in accordance with option unit configuration information received by the printer driver 901 will be described.

First, a memory map of a state wherein a print processing-related program 204 (corresponding to the printer driver 901) is loaded onto the RAM 2 on the host computer 3000 and has become executable will be described with reference to FIG. 8.

Figure 8:
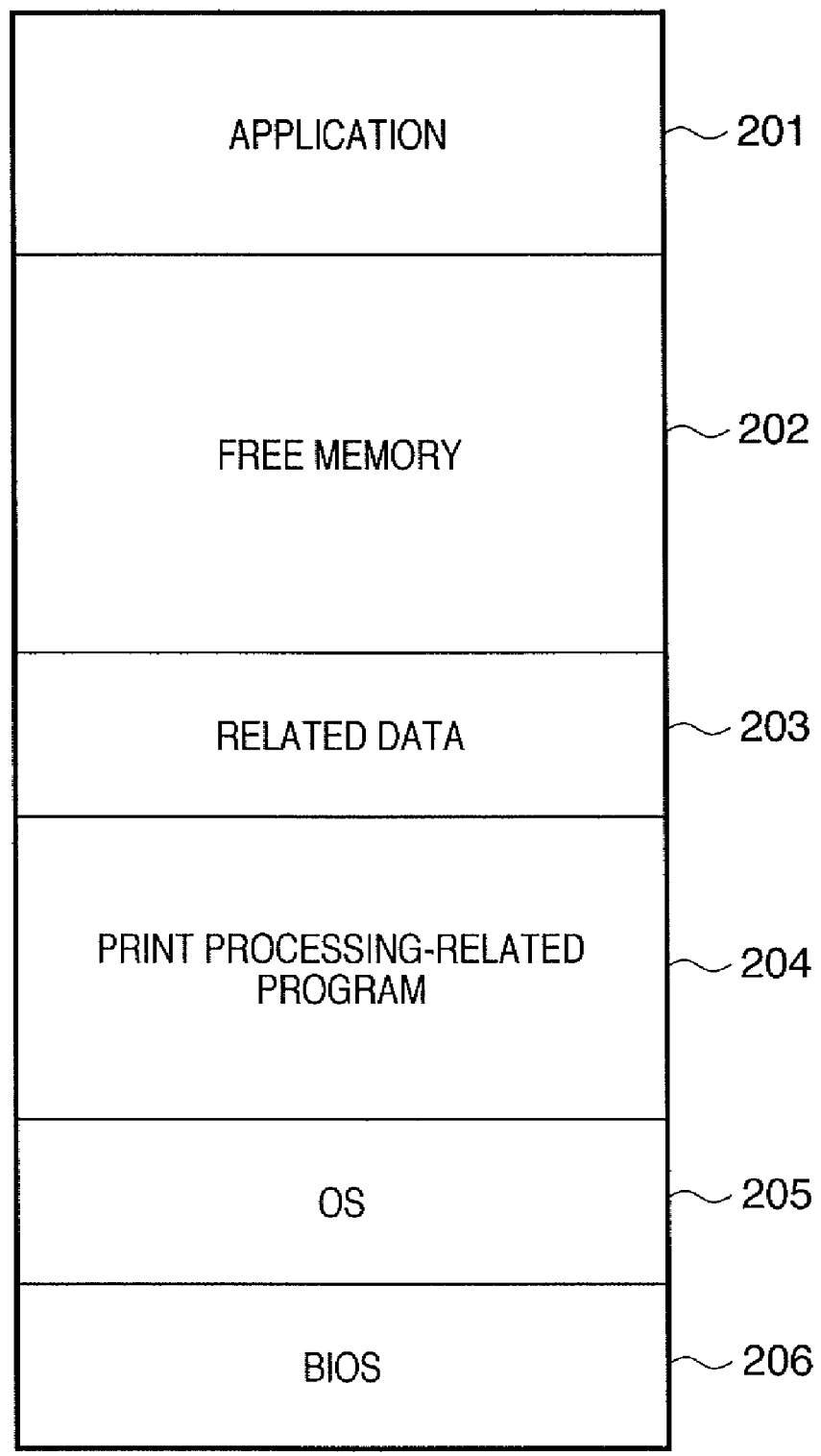
FIG. 8 is a diagram showing an example of a memory map on a RAM according to an embodiment of the present invention.

FIG. 8 is a diagram showing an example of a memory map on a RAM according to an embodiment of the present invention.

As shown in FIG. 8, a memory map constituted by an application 201, a free memory 202, related data 203, a print processing-related program (hereinafter referred to as the printer driver 901) 204, an OS 205 and a BIOS 206 is formed on the RAM 2.

Next, a configuration among respective modules of the printer driver 901 will be described with reference to FIG. 9.

Figure 9:
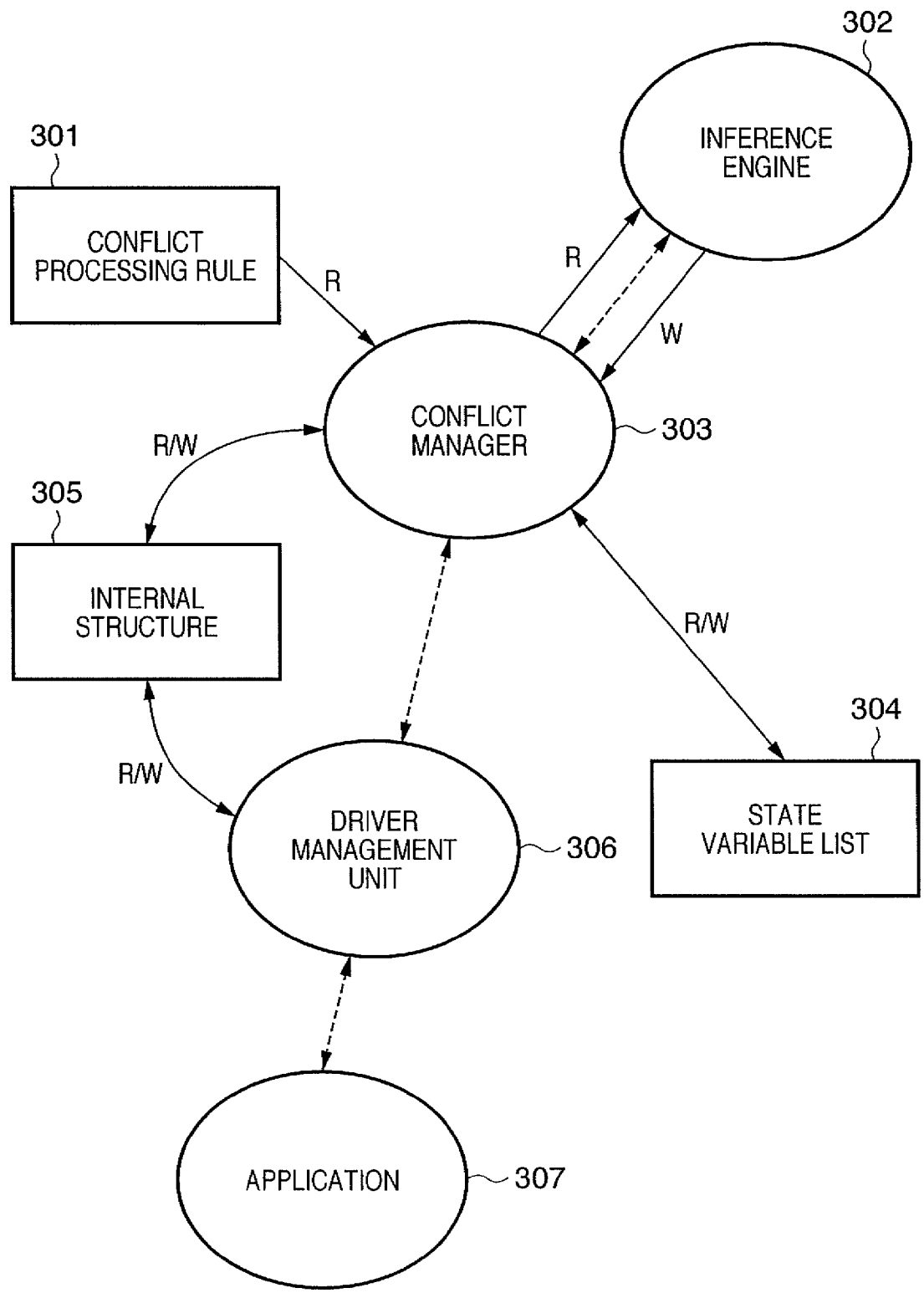
FIG. 9 is a diagram showing a configuration among respective modules of a printer driver according to an embodiment of the present invention.

FIG. 9 is a diagram showing a configuration among respective modules of a printer driver according to an embodiment of the present invention.

The printer driver 901 is constituted by a conflict processing rule 301, an inference engine 302, a conflict manager 303, a state variable list 304, an internal structure 305 and a driver management unit 306.

The conflict processing rule 301 defines a rule for preventing inconsistencies among various settings of the printer driver 901. In other words, the conflict processing rule 301 is a rule for setting an availability of use for option units mountable to the printer 1500. A specific example of a conflict processing rule will be provided later.

The conflict manager 303 is a module for performing management so that data in the state variable list 304 and the internal structure 305 match each other.

In this case, the state variable list 304 is a list of state variables (for example, Group, Staple and Collate) respectively corresponding to setting items (for example, group, staple and sort) settable by the printer 901, and their respective values (on/off of the setting item). In addition, data in the internal structure 305 is members (for example, cGroup, cStaple and cCollate) that are variables respectively corresponding to the setting items (for example, group, staple and sort) settable by the printer driver 901, and their respective values (on=1, off=0).

In other words, the internal structure 305 functions as restriction information indicating the availability of use of option units mounted to the printer 1500.

The inference engine 302 reads the conflict processing rule 301 via the conflict manager 303, performs a conflict check (an examination on whether the setting conforms to the rule), and returns the results thereof to the conflict manager 303.

The driver management unit 306 performs display control of a UI for performing initialization processing or print settings and operation control inside the printer driver 901 in response to requests such as a print setting request from an application 307. The driver management unit 306 also requests conflict processing so as to prevent inconsistencies among various settings of the conflict manager 303.

A description of what kind of conflict processing is performed by the conflict manager 303 and the inference engine 302 utilizing the state variable list 304, the internal structure 305 and the conflict processing rule 301 will now be given using a simple specific example.

Figure 10:
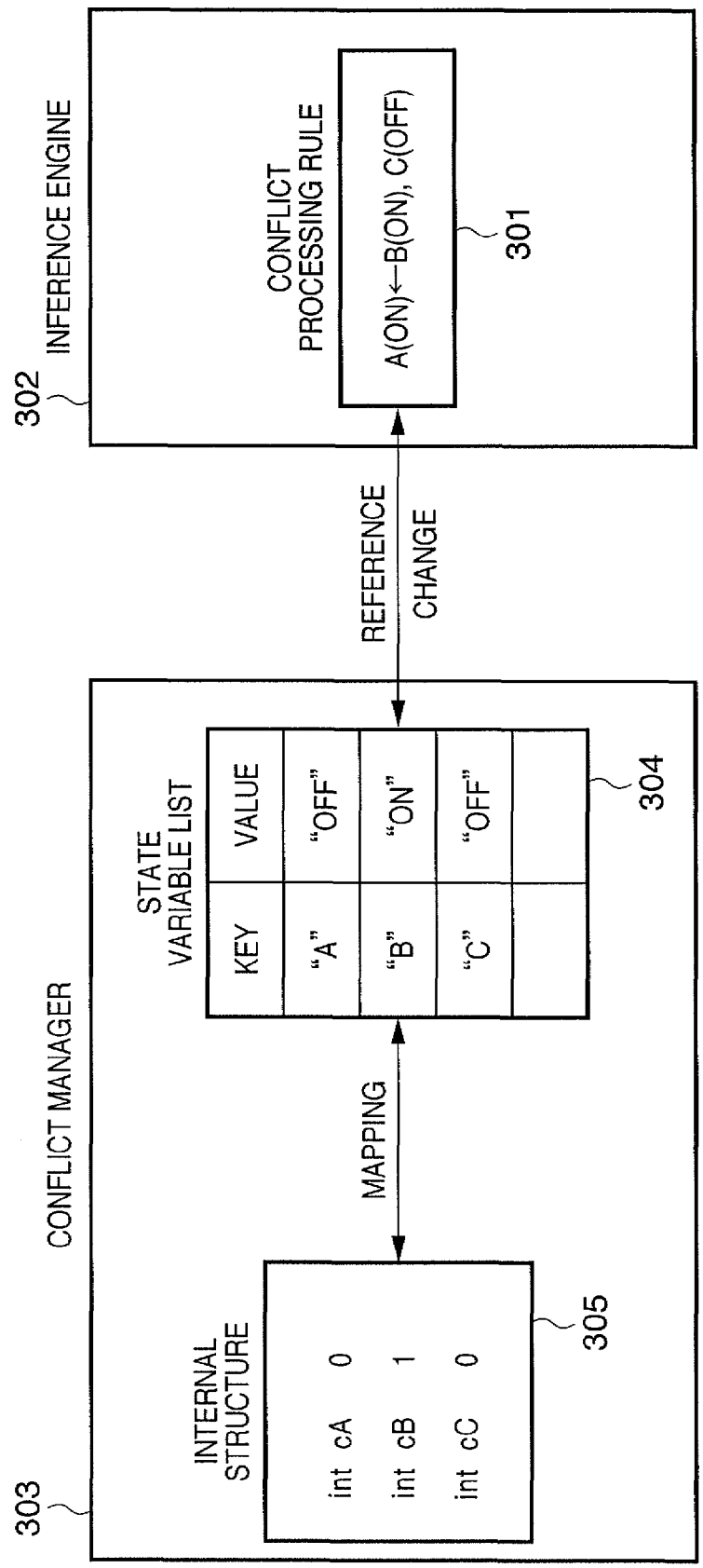
FIG. 10 is a diagram showing a specific example of conflict processing performed at a conflict manager and an inference engine according to an embodiment of the present invention.

FIG. 10 is a diagram showing a specific example of conflict processing performed at a conflict manager and an inference engine according to an embodiment of the present invention.

FIG. 10 shows that the conflict manager 303 utilizes the state variable list 304 and the internal structure 305 while the inference engine 302 utilizes the conflict processing rule 301. Thus, for convenience, FIG. 10 depicts the state variable list 304 and the internal structure 305 inside the frame of the conflict manager 303 and the conflict processing rule 301 inside the frame of the inference engine 302.

The specific example shown in FIG. 10 is an example of conflict processing that is in correspondence to the settings of printer function names A, B, C . . . . As shown in FIG. 10, members int cA, cB, cC . . . corresponding to the printer function names A, B, C . . . and values thereof 0, 1, 0 . . . are stored in the internal structure 305. The conflict manager 303 references the members of the internal structure 305 and the values thereof to create a state variable list 304 of state variable A=OFF, state variable B=ON, state variable C=OFF . . . . Since the inference engine 302 references this state variable list 304, the initial values of the printer function names A, B, C . . . in the inference engine 302 are OFF, ON, OFF.

It is also assumed that a rule expressed as
A (ON)<–B (ON), C (OFF) has been defined in the conflict processing rule 301.

This defines a rule that activates function A when function B is active and function C is inactive. The inference engine 302 reads the conflict processing rule 301 via the conflict manager 303. It is assumed that, at this point, a conflict check inference is made by the inference engine 302.

In this case, since the initial values are printer function name B=ON and printer function name C=OFF, the rule A (ON)<–B (ON), C (OFF) defined by the conflict processing rule 301 is true. Consequently, the inference engine 302 changes the state variable value of the printer function name A on the left hand-side to ON. That is, the inference engine 302 updates the value in the state variable list 304 to state variable A=ON.

After the conflict check inference by the inference engine 302 is concluded, the conflict manager 303 reflects the changed value of the state variable A into the corresponding member int cA of the internal structure 305 of the printer driver 901. In other words, the fact that the conflict processing rule 301 is true causes the value of int cA to be changed from "0" to "1".

According to processing such as shown above, the conflict manager 303 and the inference engine 302 update the state variable list 304 so that inconsistencies do not occur among the respective settings thereof. In addition, updates are reflected into setting information (members cA, cB, . . . ) in the internal structure 305 which is utilized by the driver management unit 306 for the UI.

The above-described rule defined by the conflict processing rule 301 is provided in order to provide a simple specific example. For instance, the conflict processing rule 301 according to the present embodiment is capable of defining the rule examples (1), (2), (3) and (4) presented below.

$$ZFold(DISABLE) \leftarrow Puncher\_closerThan\_Fold(ON), Punch(ON) \quad (1)$$

$$Punch(DISABLE) \leftarrow Puncher\_closerThan\_Fold(ON), ZFold(ON) \quad (2)$$

$$Punch(OFF) \leftarrow Booklet(ON) \quad (3)$$

$$ZFold(OFF) \leftarrow Booklet(ON) \quad (4)$$

In this case, Punch represents a "punching function", ZFold represents a "z-fold function", and Booklet represents a "booklet function". Puncher_closerThan_Fold indicates whether or not the mounting position of the puncher unit 506 is closer to the main body unit 503 than the folding unit 507.

An ON state of Puncher_closerThan_Fold indicates that the puncher unit 506 is closer to the main body unit 503 than the folding unit 507. In addition, the description of DISABLE attached to the rules (1) and (2) indicates a state where the functions are unavailable.

With the printer 1500 according to the present embodiment, functional restrictions vary according to the order of option units. Restrictions are created depending on the order in which functions are to be applied as described by an example wherein, with respect to z-folding that scores the paper in a Z pattern, while punch holes can be opened after performing z-folding, z-folding cannot be performed after opening punch holes. In the above-described example of the conflict processing rule, this restriction is expressed as a rule wherein the z-folding function and the punching function cannot be simultaneously set when the mounting position of the puncher unit 506 is closer to the main body unit 503 than the folding unit 507.

In other words, the conflict processing rule may be described as follows. The simultaneous use of a first option unit and a second option unit is prohibited when: processing by the first option unit cannot be performed on a sheet of paper after processing by the second option unit; and the mounting position of the first option unit is closer to an image forming apparatus than the second option unit. In this case, the first option unit is the puncher unit 506, the second option unit is the folding unit 507 and the image forming apparatus is the printer 1500.

Next, UI control processing performed by the printer driver 901 of the host computer 3000 according to the present embodiment will be described with reference to FIG. 11.

Figure 11:
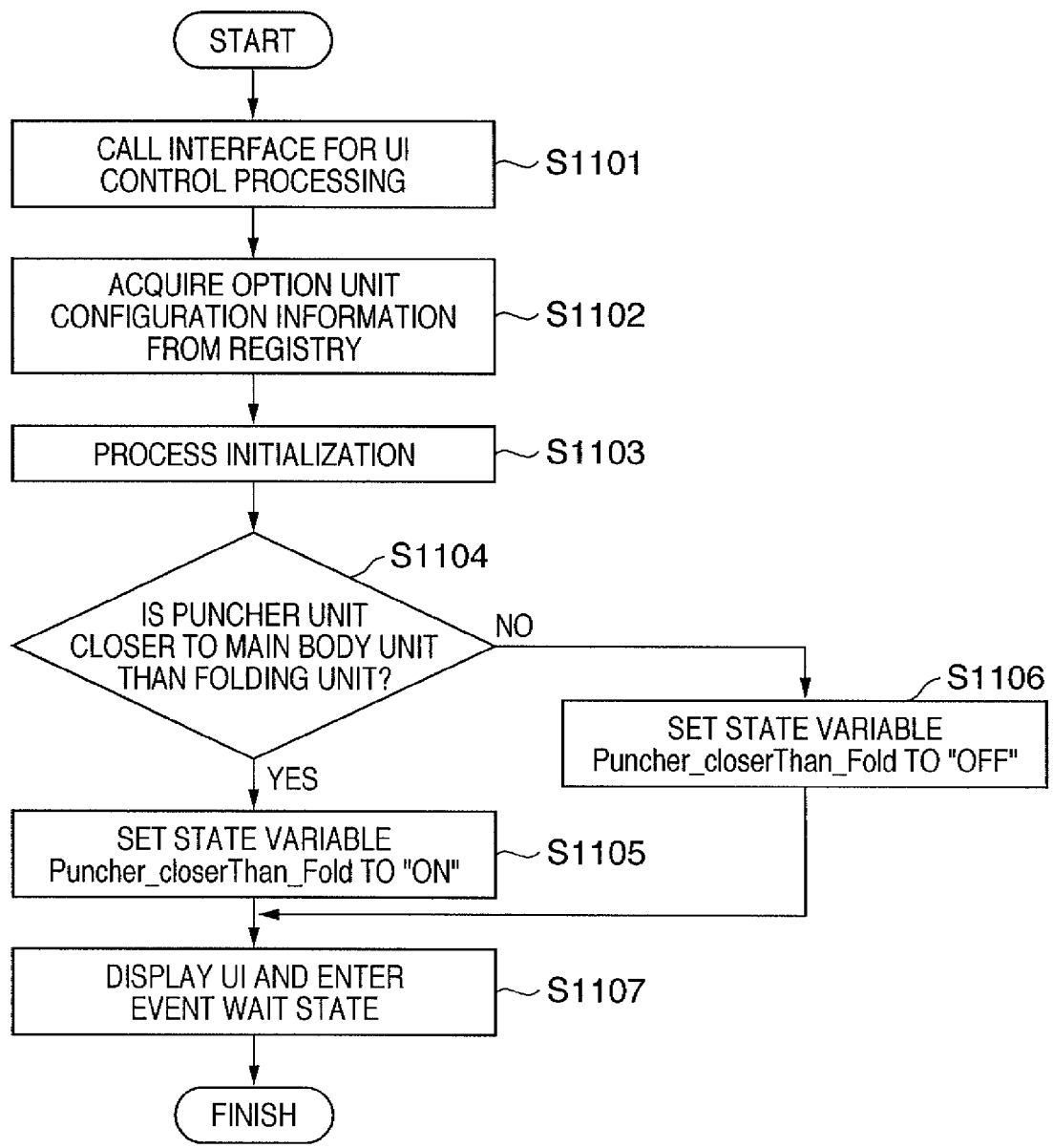
FIG. 11 is a flowchart showing UI control processing of a printer driver according to an embodiment of the present invention.

FIG. 11 is a flowchart showing UI control processing of a printer driver according to an embodiment of the present invention.

When an API for opening a driver UI of the printer driver 901 is called by the application 201, driver UI corresponding to the API at printer driver 901 is called (step S1101). Incidentally, API is an acronym for Application Program Interface.

Next, the printer driver 901 acquires option unit configuration information (option unit setting information) stored in the registry 903 (step S1102). In this case, as an example, it is assumed that the option unit configuration information to be acquired has the same contents as the option unit configuration information 600 shown in FIG. 6.

Upon acquisition of the option unit configuration information, the printer driver 901 executes initialization processing (step S1103). With the initialization processing, a memory region for internal data such as the state variable list 304 shown in FIG. 9 is reserved on the RAM 2 and then initialized. As described with reference to FIG. 10, the value of a state variable in the state variable list 304 is associated with the value of a corresponding member in the internal structure 305 to be used by the printer driver 901. Thus, the initial values of all state variables in the state variable list 304 take the values of the members in the internal structure 305.

In step S1103, initialization processing of state variables is performed via the conflict manager 303. In the initialization processing, the internal structure 305 is referenced to create the state variable list 304 of the printer driver 901. In addition, at the same time the initialization processing is being performed, the inference engine 302 reads the conflict processing rule 301 via the conflict manager 303.

At this point, it is assumed that Punch, ZFold, Booklet, and Puncher_closerThan_Fold are defined as members of the internal structure 305 of the printer driver 901 and that the initial values of the respective members of corresponding state variables are as shown as <State 1> below.

<State 1>
Punch(OFF)
ZFold(OFF)
Booklet(OFF)
Puncher_closerThan_Fold(OFF)

After the initialization processing is concluded, based on the acquired option unit configuration information, the printer driver 901 judges whether the mounting position of the puncher unit 506 is closer to the main body unit 503 than the folding unit 507 (step S104).

In the case where the mounting position of the puncher unit 506 is closer to the main body unit 503 than the folding unit 507 (YES in step S1104), Puncher_closerThan_Fold is set to "ON" (step S1105). Meanwhile, if not (NO in step S1104), Puncher_closerThan_Fold is set to "OFF" (step S1106).

Focusing now on the mounting direction "horizontal 1" in the option unit configuration information 600 according to the present embodiment, it is shown that the mounting order of the puncher unit 506 is "2" and the mounting order of the folding unit 507 is "3". Therefore, in this case, the puncher unit 506 is judged to be closer to the main body unit 503 than the folding unit 507. Consequently, in this case, the state of Puncher_closerThan_Fold is changed to "ON" and the respective members of the state variables make a transition from <State 1> above to <State 2> below.

<State 2>
Punch(OFF)
ZFold(OFF)
Booklet(OFF)
Puncher_closerThan_Fold(ON)

Figure 12:
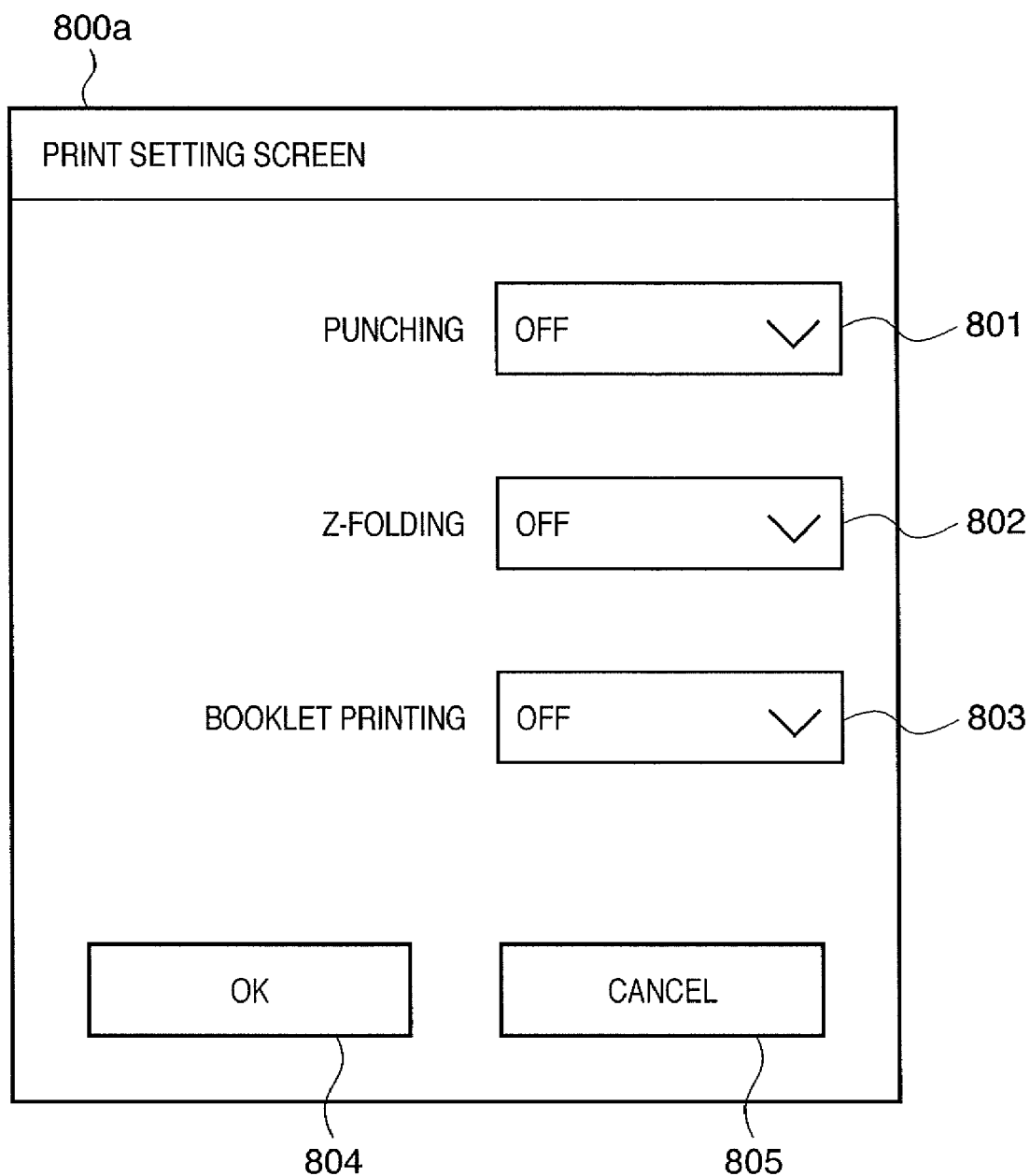
FIG. 12 is a diagram showing an example of a UI screen according to an embodiment of the present invention.

Once initialization of the state variables is concluded, based on the initialized state variables, the printer driver 901 displays a UI screen (print setting screen) and enters an event wait state (step. S1107). The UI screen displayed in this state is shown in FIG. 12 as UI screen 800*a*.

In the UI screen 800*a*, combo boxes 801 to 803 are controls respectively controlling the on/off of the punching function, the z-fold function and the booklet printing function. Since the state variable Puncher_closerThan_Fold is to be used as information for internally performing conflict processing and therefore is not a function to be set by the user, Puncher_closerThan_Fold will not be displayed on the UI screen 800*a*. When the OK button 804 is pressed after settings are changed on the UI screen 800*a* and upon finalizing the settings, the OK button 804 saves the settings at the present state in the internal structure 305 and closes the UT screen 800*a*. On the other hand, when the cancel button 805 is pressed, the UT screen 800*a* is closed without saving the changed settings.

Next, UT control processing in the case where the user operates the UT screen 800*a* shown in FIG. 12 will be described with reference to FIG. 13.

Figure 13:
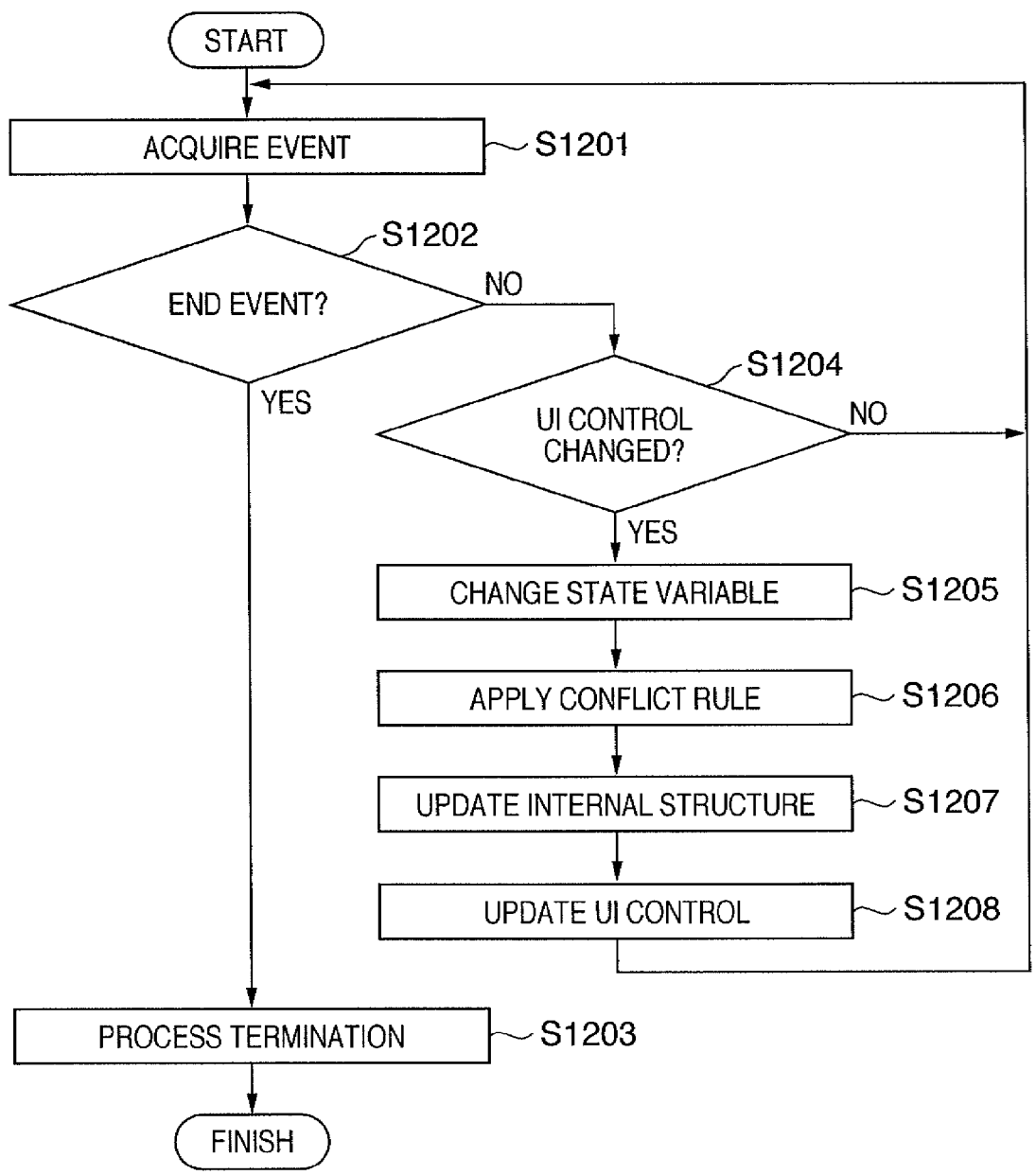
FIG. 13 is a flowchart showing UI control processing when operating a UI screen according to an embodiment of the present invention.

FIG. 13 is a flowchart showing UI control processing when operating a UT screen according to an embodiment of the present invention.

This processing commences from the event wait state of step S1107 shown in FIG. 11.

First, when an operation to the UI screen 800*a* triggers a given event, the printer driver 901 acquires the event (step S1201). Next, the printer driver 901 judges whether the acquired event is an end event (step S1202). This end event occurs by pressing either the OK button 804 or the cancel button 805 on the UI screen 800*a*.

In the case of an end event (YES in step S1202), end processing such as saving settings is executed and processing is terminated (step S1203). On the other hand, in the case where the event is not an end event (NO in step S1202), the printer driver 901 judges whether the acquired event is a UI control change (step S1204).

In the case of a UI control change (YES in step S1204), the printer driver 901 updates the state variable list 304 in accordance with the UI control change (step S1205). In the present embodiment, it is assumed that, in the state of the UI screen 800*a*, the punching function combo box 801 is set from "OFF" to "ON". When the combo box 801 is changed from "OFF" to "ON", the respective members of the state variables make a transition from <State 2> above to <State 3> below.

<State 3>
Punch(ON)
ZFold(OFF)
Booklet (OFF)
Puncher_closerThan_Fold(ON)

In <State 3>, the printer driver 901 applies the above-described conflict processing rules (1) to (4) (step S1206). Conflict processing rule (1) corresponds to the conflict processing rule of a case where the state changes to Punch (ON). In the case where Punch (ON) and Puncher_closerThan_Fold (ON), performing processing according to the conflict processing rule (1) changes the state of ZFold to DISABLE. At this point, the respective members of the state variables make a transition from <State 3> above to <State 4> below.

<State 4>
Punch(ON)
ZFold(DISABLE)
Booklet(OFF)
Puncher_closerThan_Fold(ON)

In <State 4>, since an applicable conflict processing rule does not exist, the internal structure 305 corresponding to each member of the above-described state variables is updated (step S1207). Subsequently, the control of the UI screen is updated according to the state variables (step S1208).

Figure 14:
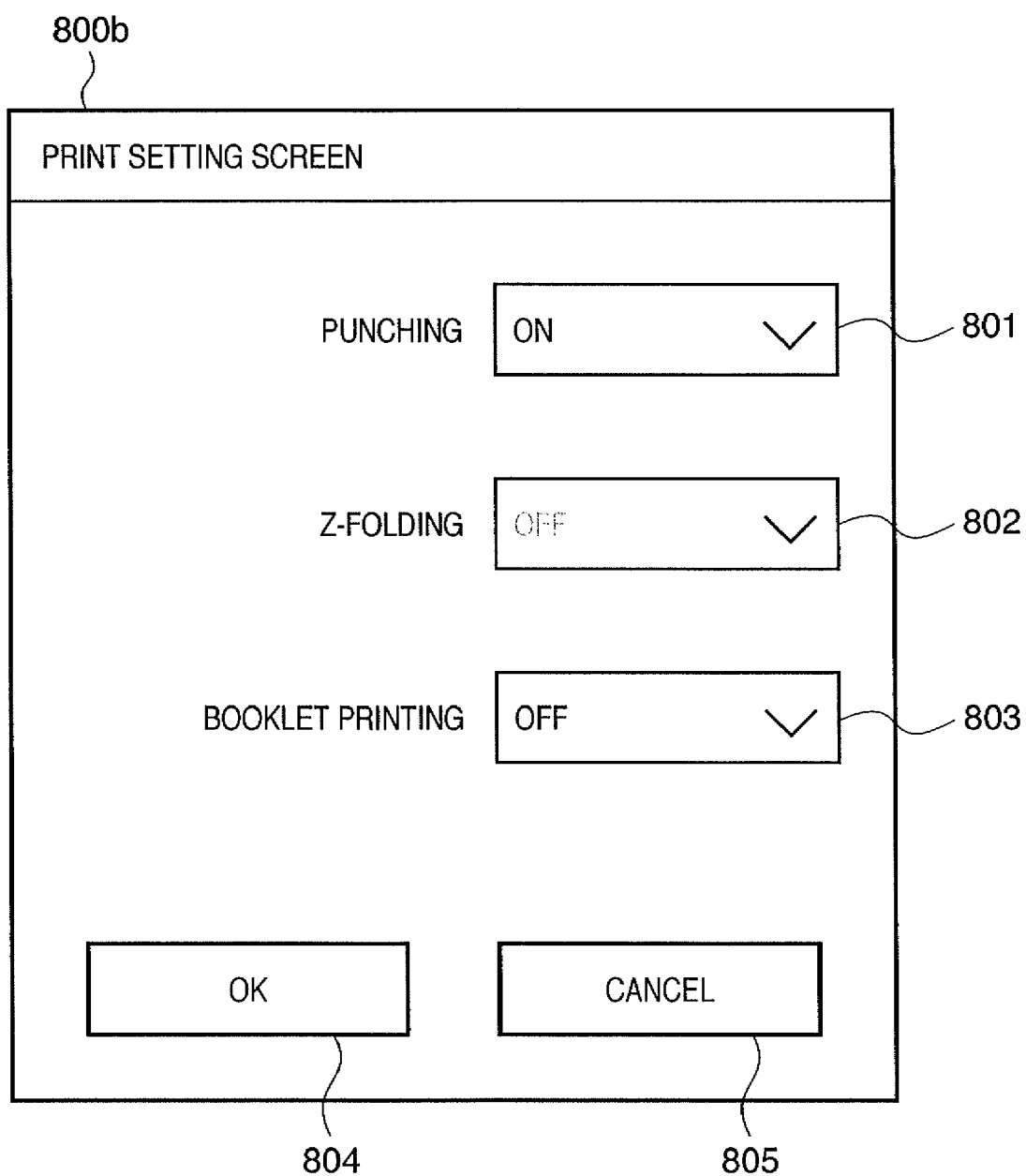
FIG. 14 is a diagram showing an example of a UI screen according to an embodiment of the present invention.

The updated UI screen is shown as UI screen 800*b* in FIG. 14. The combo box 803 corresponding to the z-fold function can be seen as being grayed out due to the change of the state variable ZFold to "DISABLE". The state wherein the combo box 803 has been grayed out and user control of the z-fold function is disabled inhibits simultaneous activation of the punching function and the z-fold function.

After the update of UI control is concluded, the processing flow returns to step S1201 to once again acquire an event, and repeats the series of processing up to the closing of the UI screen.

This concludes the description on the processing in a case where the configuration of option units is in the state of the multi-function printer 500*a* shown in FIG. 2A.

Next, a description will be given on processing in a case where the state of the mounting orders of the folding unit 507 and the puncher unit 506 is switched from the multi-function printer 500*a* shown in FIG. 2A to the configuration of the multi-function printer 500*b* shown in FIG. 2B.

In this case, option unit configuration information corresponding to the configuration of the multi-function printer 500*b* is shown in FIG. 15 as option unit configuration information 601. With the multi-function printer 500*b*, the "staple unit", the "folding unit", the "puncher unit" and the "saddle tray" are managed in this order that is a mounting order originating at the main body unit 503 shown in FIG. 2B in the mounting direction "horizontal 1" of the option unit configuration information 601. In addition, the "side paper deck" is managed in the mounting direction "horizontal 2" with the main body unit 503 shown in FIG. 2B as an origin thereof. Furthermore, the "ADF" is managed in the "vertical" mounting direction with the main body unit 503 shown in FIG. 2B as an origin thereof.

Figure 16:
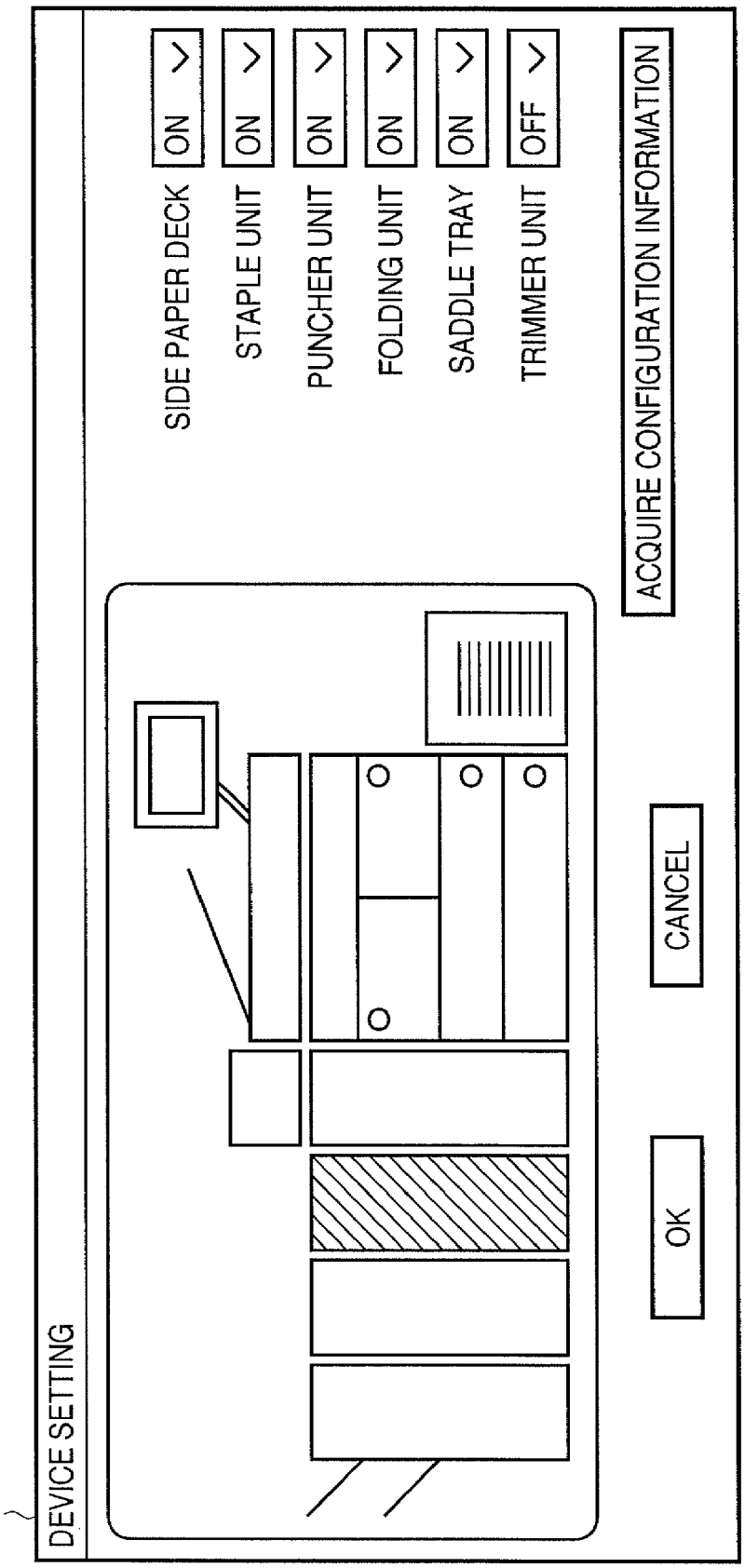
FIG. 16 is a diagram showing an example of a device setting screen according to an embodiment of the present invention.

When the processing shown in FIG. 5 is executed in the state of the option unit configuration information 601, in step S1009, a device setting screen 700*c* shown in FIG. 16 is displayed, and, further, the contents of the option unit configuration information 601 are stored in the registry 903.

Next, UI control processing in a state where information of the option unit configuration information 601 is acquired will be described with respect to FIGS. 11 and 13.

Since the processing from step S1101 to step S1103 shown in FIG. 11 is the same as described above, a description thereof will be omitted. The option unit configuration information acquired in step S1102 will have the same contents as the option unit configuration information 601 shown in FIG. 15.

At this point, it is assumed that Punch, ZFold, Booklet, and Puncher_closerThan_Fold are defined as members of the internal structure 305 of the printer driver 901 and that the initial values of the respective members of corresponding state variables are as shown as <State 1a> below.

<State 1a>
Punch(OFF)
ZFold(OFF)
Booklet(OFF)
Puncher_closerThan_Fold(OFF)

After the conclusion of initialization processing, based on the acquired option unit configuration information, the printer driver 901 judges whether the mounting position of the puncher unit 506 is closer to the main body unit 503 than the folding unit 507 (step S1104).

Focusing now on the mounting direction "horizontal 1" in the option unit configuration information 601 according to the present embodiment, it is shown that the mounting order of the folding unit 507 is "2" and the mounting order of the puncher unit 506 is "3". Therefore, in this case, the folding unit 507 is judged to be closer to the main body unit 503 than the puncher unit 506. Consequently, in this case, while Puncher_closerThan_Fold will be in the "OFF" state, since the state is not changed, no changes will occur in the respective members of the state variables.

Once initialization of the state variables is concluded, based on the initialized state variables, the printer driver 901 displays a UI screen and enters an event wait state (step S1107). The UI screen displayed in this state is shown in FIG. 12 as UI screen 800a.

Next, UI control processing in the case where the user operates the UI screen 800a shown in FIG. 12 will be described with reference to FIG. 13.

Since the processing from step S1201 to step S1204 shown in FIG. 13 is the same as described above, a description thereof will be omitted.

Here, a case where UI control is changed due to an operation performed on the UI screen 800a will be described. In the present embodiment, it is assumed that, in the state of UI screen 800a, the punching function combo box 801 is set from "OFF" to "ON". When the combo box 801 is changed from "OFF" to "ON", the respective members of the state variables make a transition from <State 1a> above to <State 2a> below.

<State 2a>
Punch(ON)
ZFold(OFF)
Booklet(OFF)
Puncher_closerThan_Fold(OFF)

In <State 2a>, the printer driver 901 applies the above-described conflict processing rules (1) to (4) (step S1206). Conflict processing rule (1) corresponds to the conflict processing rule of a case where the state changes to Punch (ON). When performing processing according to the conflict processing rule (1), since the state of Puncher_closerThan_Fold is "OFF", the rule is not applied and the respective members of the state variables will remain unchanged.

Since there are no more applicable conflict processing rules in this state, the internal structure 305 corresponding to each member of the above-described state variables is updated (step S1207). Subsequently, the control of the UI screen is updated according to the state variables (step S1208).

An example of the updated UI screen is shown as UI screen 800c in FIG. 17. In this state, further changing the z-fold setting to "ON" on the UI screen 800c causes a transition of the respective members of the state variables from <State 2a> above to <State 3a>

<State 3a>
Punch(ON)
ZFold(ON)
Booklet(OFF)
Puncher_closerThan_Fold(OFF)

In this state, the printer driver 901 applies the above-described conflict processing rules (1) to (4). Conflict processing rule (2) corresponds to the conflict processing rule in case where the state changes to ZFold (ON). However, since the conflict processing rule (2) will not become true unless Puncher_closerThan_Fold is "ON", the conflict processing rule is not applied. The internal structure 305 corresponding to each member is updated, with the respective members of the state variables remaining in the above-described state. Subsequently, the control of the UI screen is updated according to the state variables.

An example of the updated UI screen is shown as UI screen 800d in FIG. 18. In this case, it is shown that both the punching function and the z-fold function are simultaneously activated.

As shown, in the case where the folding unit 507 is mounted closer to the main body unit 503 than the puncher unit 506, control will be performed so that both the punching function and the z-fold function can be set so as to be simultaneously activated.

As described above, according to the present embodiment, by having a printer driver control restrictions dependent on the mounting order of option units, the input of contradictory settings can be prevented and, in turn, user convenience can be improved.

In addition, by displaying a device preview screen that displays a schematic image of an option unit configuration reflecting order information on the option units, an accurate option unit configuration can be conveyed to the user.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-026069 filed on Feb. 5, 2007, which is hereby incorporated by reference herein in its entirety.

What is claimed is:

1. An information processing apparatus that controls an image forming apparatus to which a plurality of option units is mountable, said information processing apparatus comprising:
    storage means that stores rules for setting an availability of use of an option unit mountable to said image forming apparatus;
    acquisition means that acquires option unit configuration information indicating a mounting method of an option unit mounted to said image forming apparatus; and
    determination means that determines, based on a mounting method of option units indicated by the option unit configuration information acquired by said acquisition means and a rule stored in said storage means, the availability of use of an option unit mounted to said image forming apparatus, wherein
    the rules are for setting, based on a mounting order of a plurality of option units mountable to said image forming apparatus, the availability of use of the option unit,
    the option unit configuration information further includes information indicating a mounting order of a plurality of option units mounted to said image forming apparatus, and
    the rules further are rules that prohibit the simultaneous use of a first option unit and a second option unit in the case where processing by the first option unit cannot be performed on a sheet of paper after processing by the second option unit thereon and the mounting position of the second option unit is closer to said image forming apparatus than the first option unit.

2. The information processing apparatus according to claim 1, further comprising:
    display means that displays a setting screen including setting items for setting the use of an option unit mounted to said image forming apparatus; and
    control means that controls, based on a determination result by said determination means, on or off states of the setting items in the setting screen for setting the use of the option unit mounted to said image forming apparatus.

3. The information processing apparatus according to claim 1, wherein
    said acquisition means acquires the option unit configuration information from said image forming apparatus.

4. The information processing apparatus according to claim 1, wherein
    said determination means determines the respective availabilities of use of the plurality of option units mounted to said image forming apparatus based on information indicating a mounting order of option units mounted to said image forming apparatus included in the option unit configuration information and on the rule.

5. The information processing apparatus according to claim 1, wherein
    the option unit configuration information further includes information on the direction in which the option unit is mounted with respect to said image forming apparatus.

6. The information processing apparatus according to claim 1, further comprising
    operation window display means that displays an operation screen including a schematic image showing a mounting state of an option unit mounted to said image forming apparatus which is indicated by the option unit configuration information acquired by said acquisition means.

* * * * *